US012575585B2

(12) United States Patent
Fricke et al.

(10) Patent No.: US 12,575,585 B2
(45) Date of Patent: Mar. 17, 2026

(54) CRUMB CHOCOLATE FLAVOR COMPOSITIONS

(71) Applicant: MARS, Incorporated, McLean, VA (US)

(72) Inventors: Kristina Fricke, Freising (DE); Peter Schieberle, Freising (DE); John P. Munafo, Hackettstown, NJ (US); John Didzbalis, Hackettstown, NJ (US)

(73) Assignee: MARS, Incorporated, McLean, VA (US)

(*) Notice: Subject to any disclaimer, the term of this patent is extended or adjusted under 35 U.S.C. 154(b) by 423 days.

(21) Appl. No.: 15/779,884

(22) PCT Filed: Dec. 1, 2016

(86) PCT No.: PCT/US2016/064473

§ 371 (c)(1),
(2) Date: May 30, 2018

(87) PCT Pub. No.: WO2017/096077

PCT Pub. Date: Jun. 8, 2017

(65) Prior Publication Data

US 2019/0037875 A1 Feb. 7, 2019

Related U.S. Application Data

(60) Provisional application No. 62/261,800, filed on Dec. 1, 2015.

(51) Int. Cl.

| | |
|---|---|
| ***A23G 1/32*** | (2006.01) |
| ***A23G 3/32*** | (2006.01) |
| ***A23L 27/20*** | (2016.01) |

(52) U.S. Cl.

CPC ................ *A23G 1/32* (2013.01); *A23G 3/32* (2013.01); *A23L 27/2022* (2016.08);
(Continued)

(58) Field of Classification Search

CPC ......... A23G 1/32; A23G 3/32; A23L 27/2022; A23L 27/203; A23L 27/2052; A23V 2002/00

See application file for complete search history.

(56) References Cited

U.S. PATENT DOCUMENTS

| | | | |
|---|---|---|---|
| 2005/0042351 A1 | 2/2005 | Buhler et al. | |
| 2006/0286237 A1 | 12/2006 | Reiss | |

(Continued)

FOREIGN PATENT DOCUMENTS

| | | |
|---|---|---|
| CN | 102613370 A | 8/2012 |
| EP | 0940085 A2 | 9/1999 |

(Continued)

OTHER PUBLICATIONS

Liu et al. "A Comparative Study of Aroma-Active Compounds between Dark and Milk Chocolate: Relationship to Sensory Perception" Jul. 2014;Society of Chemical Industry;pp. 1362-1372 (Year: 2014).*

(Continued)

*Primary Examiner* — Latosha Hines
(74) *Attorney, Agent, or Firm* — Baker Botts L.L.P.

(57) ABSTRACT

The presently disclosed subject matter is directed to chocolate compositions containing dry milk chocolate and extraneous flavor compositions that impart a crumb chocolate flavor to a fat-based confectionery. The extraneous flavor compositions of the present disclosure can comprise (a) a highly volatile compound, (b) a lactone compound, and (c) a caramelic composition.

22 Claims, 3 Drawing Sheets

Figure 1:
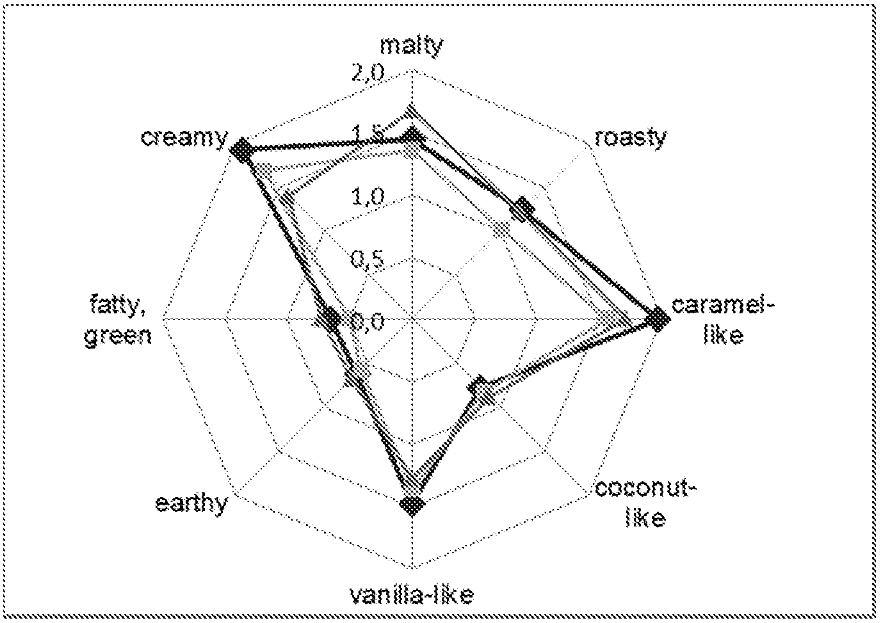

(52) U.S. Cl.
CPC ......... *A23L 27/203* (2016.08); *A23L 27/2052* (2016.08); *A23V 2002/00* (2013.01)

(56) References Cited

U.S. PATENT DOCUMENTS

| | | | | |
|---|---|---|---|---|
| 2008/0299278 | A1 | 12/2008 | Irvin | |
| 2013/0202746 | A1* | 8/2013 | Siegel | A23L 27/75 426/89 |
| 2015/0272864 | A1* | 10/2015 | Krammer | A23L 27/72 424/49 |
| 2017/0143022 | A1* | 5/2017 | Wicker | A23L 2/56 |

FOREIGN PATENT DOCUMENTS

| | | | |
|---|---|---|---|
| EP | 1084622 | A | 3/2001 |
| EP | 1084622 | A2 | 3/2001 |
| EP | 11084622 | A | 3/2001 |
| EP | 1308094 | A2 | 5/2003 |
| EP | 2389815 | A1 | 11/2011 |
| EP | 2559346 | B1 | 3/2014 |
| GB | 2370213 | A | 6/2002 |
| JP | 2005015685 | A * | 1/2005 |
| JP | 2006121958 | A | 5/2006 |
| JP | 2015027309 | A | 2/2015 |
| RU | 2181016 | C1 | 4/2002 |
| RU | 2336736 | C1 | 10/2008 |
| WO | WO03037100 | A1 | 5/2003 |
| WO | WO03007725 | A3 | 8/2003 |
| WO | 2011163664 | A1 | 12/2011 |

OTHER PUBLICATIONS

Analysis data of commercially available non-crumb milk chocolate products from 2010, p. 1.
Sep. 10, 2010, Email containing the data of D7 which was sent to Dr. Martine Trotin, p. 1.
Afoakwa et al., Flavor Formation and Character in Cocoa and Chocolate, a Critical Review, Sep. 11, 2008, pp. 1-19, Critical Reviews in Food Science and Nutrition.
Frauendorfer et al., Identification of the key aroma compounds in cocoa powder based on molecular sensory correlations, Jun. 29, 2006, pp. 1-14, vol. 54, J. Agric. Food Chem.
Kerler, Josef et al., Basic chemistry and process conditions for reaction flavours with particular focus on Maillard-type reactions, 2010, pp. 1-38, 2nd Edition, Food Flavour Technology, ISSN: 978-1-405-18543-1.
Liu et al., A comparative study of aroma-active compounds between dark and milk chocolate: relationship to sensory perception, Jul. 18, 2014, pp. 1-11, J. Sci Food Agric.
Mallia et al., Aroma-active compounds of butter: a review, Jun. 19, 2020, https://europepmc.orq/article/aqr/ind439991351.
Peterson D.G. et al., Characterization of the volatile compounds that constitute fresh sweet cream butter aroma, 2003, pp. 215-220, vol. 18, Flavour and Fragrance journal.
Schieberle et al., Characterization of Key Odorants in Chocolate, Flavor Chemistry: 30 Years of Progress, 1999, pp. 147-153, Chapter 13, Kluwer Academic/Plenum Publishers, New York.
Schmitt et al., Aroma-active compounds in Chocolate, 2005, pp. 1-36.
Schnermann, Petra et al., Evaluation of Key Odorants in Milk Chocolate and Cocoa Mass by Aroma Extract Dilution Analyses, 1997, 6 pages, vol. 45, J. Agric. Food Chem.
Stephen T. Beckett, Industrial Chocolate Manufacture and Uses, 2009, pp. 1-732, 4th Edition, Blackwell Publishing, ISBN: 978-1-405-13949-6.
Yi-Hsuan Lin, B.S., Volatile changes caused by different factors in different types of chocolate, Thesis, 2010, 115 bages.
Z Al-Attabi, Volatile Sulphur Compounds in UHT Milk, Jun. 25, 2020, p. 1, Crit Rev Food Sci Nutr, https://pubmed.ncbi.nlm.nih.gov/18949597.
Societe Des Produits Nestle S.A., Notice of Opposition against EP3383192 dated Jun. 29, 2020, 17 pages.
Firmenich SA, Notice of Opposition against EP3383192 dated Jun. 30, 2020, 31 pages.
Kraft Foods Schweiz Holding GmbH, Notice of Opposition against EP3383192 dated Jul. 1, 2020, 45 pages.
Firmenich, Letter from Opponent 2, Response to Submission of Patent Proprietor, Jan. 26, 2021, 15 pages.
Ashurst, "Flavor Improver," Chemistry and Technology of Food Flavors, Chapter 11, p. 271, Jan. 31, 2005.

* cited by examiner

CRUMB CHOCOLATE FLAVOR COMPOSITIONS

CROSS-REFERENCE TO RELATED APPLICATION

This application claims priority to U.S. Provisional Application No. 62/261,800, filed on Dec. 1, 2015, which is incorporated by reference herein in its entirety.

1. FIELD OF THE INVENTION

The presently disclosed subject matter is directed to a crumb chocolate flavor system for chocolate-based flavor compositions used in fat-based confectioneries and methods for making such compositions.

2. BACKGROUND OF THE INVENTION

Historically milk chocolate was made with milk powder and condensed milk, which was used to minimize the moisture content and to improve durability and quality of the milk chocolate. Since then, the development of different manufacturing processes led to territorial differences in the flavor of milk chocolate. For example, processes were developed in the United Kingdom and the United States that lead to the characteristic taste of their milk chocolate. These processes arose in the early part of the 20th century to circumvent the scarcity of fresh milk during certain seasons of the year. In particular, there were problems in chocolate production close to holidays where major sales of chocolate products took place but the supply of fresh milk was limited.

On that account, an intermediate ingredient called "chocolate crumb powder" was developed. Chocolate crumb powder consisted of sugar, cocoa mass (cocoa liquor) and milk being mixed together and dried (i.e., crumbing process), resulting in a product with a shelf life of at least a year. Incidentally, the drying process developed special flavors that create the unique characteristics of milk chocolate produced in the United States and Britain. As such, milk chocolate made in those countries differs in its flavor from continental European milk chocolate, which utilizes milk powder and lacks the drying step.

Current methods of making milk chocolate from a dry mix chocolate (i.e., utilizing dry milk powder) do not adequately capture the distinct aroma and creaminess of milk chocolate manufactured from chocolate crumb powder. The drying step used to produce chocolate crumb powder, however, is an unnecessary and costly step in view of the presence of continuous supplies of fresh milk. Thus, there remains a need in the art for a method of manufacturing milk chocolate or chocolate-like products that are able to capture the aroma and creaminess of crumb chocolate (i.e., milk chocolate made with chocolate crumb powder) without the need for a thermal step.

By accurately tailoring milk chocolate flavors beloved by consumers of milk chocolate produced in the United States and Britain, the presently disclosed subject matter addresses this need. In the disclosed subject matter, a group of flavors or odorants that are common to crumb chocolate has been identified, whereby specific components can be added to fat-based confection made with dry mix chocolate to create the flavor of crumb chocolate without the need for the laborious and costly drying step. The presently disclosed subject matter also discloses a group of flavors or odorants that are common to crumb chocolate that can be added to fat-based confection to create the flavor of crumb chocolate.

3. SUMMARY OF THE INVENTION

The presently disclosed subject matter is directed to a crumb chocolate flavor system for chocolate-based flavor compositions used in fat-based confectioneries and methods for making such compositions.

In certain embodiments, the chocolate composition comprises dry milk chocolate and an extraneous flavor composition, where the extraneous flavor composition comprises a highly volatile compound, a lactone compound, and a caramelic composition, and where the caramelic composition comprises dimethylhydroxy furanone, phenylacetaldehyde, and maltol.

In certain embodiments, the lactone compound of the extraneous flavor composition is selected from the group consisting of δ-dodecalactone, δ-decalactone, γ-nonalactone, δ-octalactone, γ-undecalactone, δ-valerolactone, γ-valerolactone, δ-hexalactone, γ-hexalactone, δ-heptalactone, γ-heptalactone, γ-octalactone, δ-octenolactone, δ-nonalactone, γ-decalactone, δ-decenolactone (massoia lactone), δ-undecalactone, γ-dodecalactone, 5-butyldihydro-4-methylfuran-2(3H)-one (whiskey lactone), 6-pentylpyran-2-one, and combinations thereof. In other embodiments, the lactone compound is selected from the group consisting of δ-dodecalactone, 6-decalactone, δ-octalactone, γ-nonalactone, γ-undecalactone, and combinations thereof.

In certain embodiments, the highly volatile compound of the extraneous flavor composition is selected from the group consisting of methanethiol, 2,3-butanedione, 2-methylbutanal, 3-methylbutanal, methylpropanal, and combinations thereof. In alternative embodiments, the highly volatile compound is methanethiol.

In certain embodiments, the extraneous flavor composition is admixed at a concentration from about 500 μg/kg to about 5000 μg/kg of the chocolate composition. In other embodiments, the extraneous flavor composition is admixed at a concentration from about 3000 μg/kg to about 4000 μg/kg of the chocolate composition.

In alternative embodiments, the extraneous flavor composition is admixed at a concentration from about 0.00005% to about 20% w/w of the chocolate composition, or from about 0.0001% to about 17% w/w of the chocolate composition.

In certain embodiments, the highly volatile compound is present in an amount of from about 0.001% to about 25% w/w of the extraneous flavor composition. In certain embodiments, the lactone compound is present in an amount of from about 0.01% to about 98% w/w of the extraneous flavor composition. In certain embodiments, the caramelic composition is present in an amount of from about 0.005% to about 25% w/w of the extraneous flavor composition.

In other embodiments, the caramelic composition comprises dimethylhydroxy furanone in an amount of from about 0.1% to about 20% w/w of the extraneous flavor composition; phenylacetaldehyde in an amount of from about 0.005% to about 1% w/w of the extraneous flavor composition; and maltol in an amount of from about 0.1% to about 5% w/w of the extraneous flavor composition.

In other embodiments, the lactone compound comprises δ-dodecalactone in an amount of from about 5% to about 80% w/w of the extraneous flavor composition; δ-decalactone in an amount of from about 0.5% to about 15% w/w of the extraneous flavor composition; γ-nonalactone in an amount of from about 0.05% to about 5% w/w of the extraneous flavor composition; δ-octalactone in an amount of from about 0.1% to about 3% w/w of the extraneous flavor composition; and γ-undecalactone in an amount of from about 0.01% to about 1% w/w of the extraneous flavor composition.

In other embodiments, the highly volatile compound is methanethiol in an amount of from about 0.001% to about 0.1% w/w of the extraneous flavor composition.

In certain embodiments, the dimethylhydroxy furanone is furaneol, and the furaneol provides an odor activity value higher than 1, preferably between 6 and 8, and where phenylacetaldehyde and maltol each provides an odor activity values less than 1. In certain embodiments, the lactone compound provides an odor activity value less than 1.

In other embodiments of the presently disclosed subject matter, the extraneous flavor composition comprises a highly volatile compound, a lactone compound, and a caramelic composition, where the caramelic composition comprises dimethylhydroxy furanone, phenylacetaldehyde, and maltol; such a flavor composition provides enhanced creaminess to a chocolate composition.

In certain embodiments of the flavor composition, the lactone compound is selected from the group consisting of δ-dodecalactone, δ-decalactone, δ-octalactone, γ-nonalactone, γ-undecalactone, and combinations thereof.

In certain embodiments of the flavor composition, the highly volatile compound is selected from the group consisting of methanethiol, 2,3-butanedione, 2-methylbutanal, 3-methylbutanal, methylpropanal, and combinations thereof.

In other embodiments of the flavor composition, the highly volatile compound is methanethiol. In certain embodiments of the flavor composition, the highly volatile compound is present in an amount of from about 0.001% to about 25% w/w of the flavor composition.

In certain embodiments of the flavor composition, the lactone compound is present in an amount of from about 0.01% to about 98% w/w of the flavor composition.

In certain embodiments of the flavor composition, the caramelic composition is present in an amount of from about 0.005% to about 25% w/w of the flavor composition.

In other embodiments of the flavor composition, the caramelic composition comprises dimethylhydroxy furanone in an amount of from about 0.1% to about 20% w/w of the flavor composition; phenylacetaldehyde in an amount of from about 0.005% to about 1% w/w of the flavor composition; and maltol in an amount of from about 0.1% to about 5% w/w of the flavor composition.

In other embodiments of the flavor composition, the lactone compound comprises δ-dodecalactone in an amount of from about 5% to about 80% w/w of the flavor composition; δ-decalactone in an amount of from about 0.5% to about 15% w/w of the flavor composition; γ-nonalactone in an amount of from about 0.05% to about 5% w/w of the flavor composition; δ-octalactone in an amount of from about 0.1% to about 3% w/w of the flavor composition; and γ-undecalactone in an amount of from about 0.01% to about 1% w/w of the flavor composition.

In other embodiments of the flavor composition, the highly volatile compound is methanethiol in an amount of from about 0.001% to about 0.1% w/w of the flavor composition.

In one embodiment, the flavor composition comprises between about 0.1% w/w and about 20% w/w dimethylhydroxy furanone; between about 5% w/w and about 80% w/w δ-dodecalactone; between about 0.005% w/w and about 1% w/w phenylacetaldehyde; between about 0.1% w/w and about 5% w/w maltol; between about 0.001% w/w and about 0.1% w/w methanethiol; between about 0.5% w/w and about 15% w/w δ-decalactone; between about 0.1% w/w and about 3% w/w δ-octalactone; between about 0.05% w/w and about 5% w/w γ-nonalactone; and between about 0.01% w/w and about 1% w/w γ-undecalactone.

In another embodiment, the flavor composition comprises about 18.5% w/w dimethylhydroxy furanone; about 69% w/w δ-dodecalactone; about 0.6% w/w phenylacetaldehyde; about 0.3% w/w maltol; about 0.08% w/w methanethiol; about 7.1% w/w δ-decalactone; about 0.7% w/w δ-octalactone; about 3.9% w/w γ-nonalactone; and about 0.2% w/w γ-undecalactone.

In an alternative embodiment, the flavor composition comprises about 5.2% w/w dimethylhydroxy furanone; about 73% w/w δ-dodecalactone; about 0.3% w/w phenylacetaldehyde; about 4.5% w/w maltol; about 0.03% w/w methanethiol; about 12.3% w/w δ-decalactone; about 2.7% w/w δ-octalactone; about 1.5% w/w γ-nonalactone; and about 0.6% w/w γ-undecalactone.

The flavor compositions of the presently disclosed subject matter can be modified to provide for any number of improved flavor profiles, which closely mimic those products otherwise formed from chocolate crumb powder. The flavor compositions of the presently disclosed subject matter can be used throughout the entire food industry, for example, for the flavoring or enhanced flavoring of confections, snack food products, beverages and bakery products, among others. The concentration of such flavor compositions comprise a wide array of levels and ranges, as the intensity will depend on the finished food products as well as end user preferences.

The foregoing has outlined rather broadly the features and technical advantages of the presently disclosed subject matter in order that the detailed description of the invention that follows can be better understood. Additional features and advantages of the invention will be described hereinafter which form the subject of the claims of the invention. It should be appreciated by those skilled in the art that the conception and specific embodiment disclosed can be readily utilized as a basis for modifying or designing other structures for carrying out the same purposes of the presently disclosed subject matter. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description.

4. DESCRIPTION OF THE FIGURES

FIG. 1 provides a sensory profile of dry mix chocolate (DMGC; triangles) and crumb chocolate (CGC; diamonds). A sensory profile of crumb powder (squares) is included as a reference. The profile was established by trained panelists who rated specific attributes based on a seven-point scale in 0.5 increments from 0 to 3, with 0=not detectable, 1=weakly detectable, 2=clearly detectable, and 3=intensively detectable.

Figure 2:
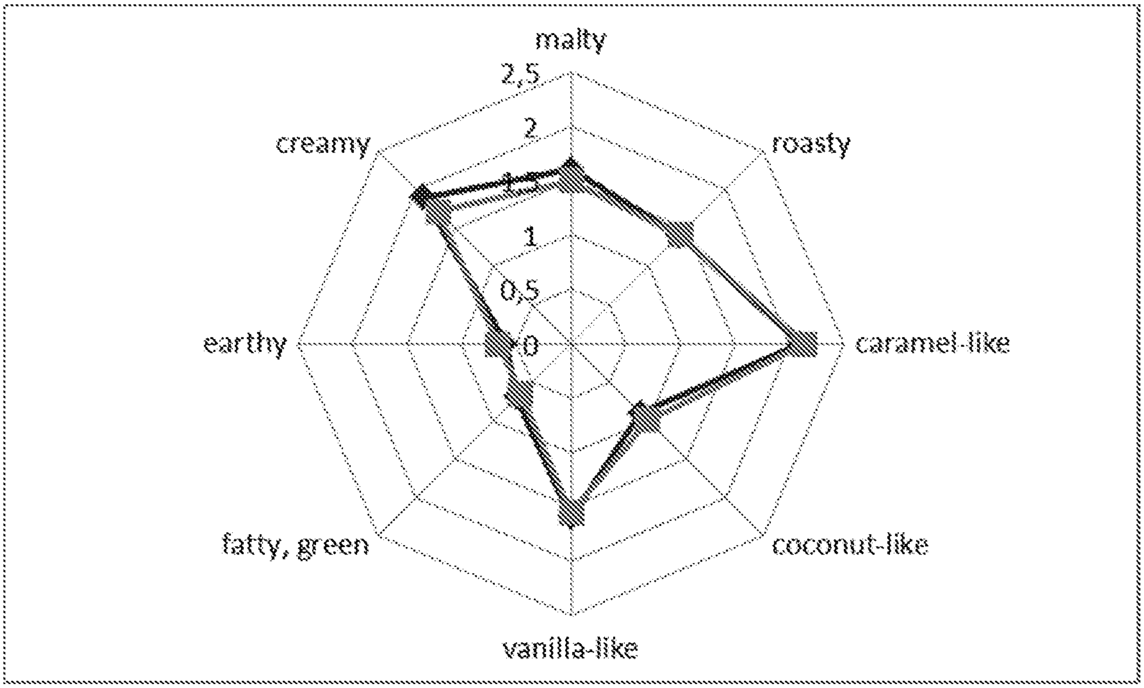

FIG. 2 provides a sensory profile analysis of crumb chocolate (diamonds) and its corresponding recombinant (squares).

Figure 3:
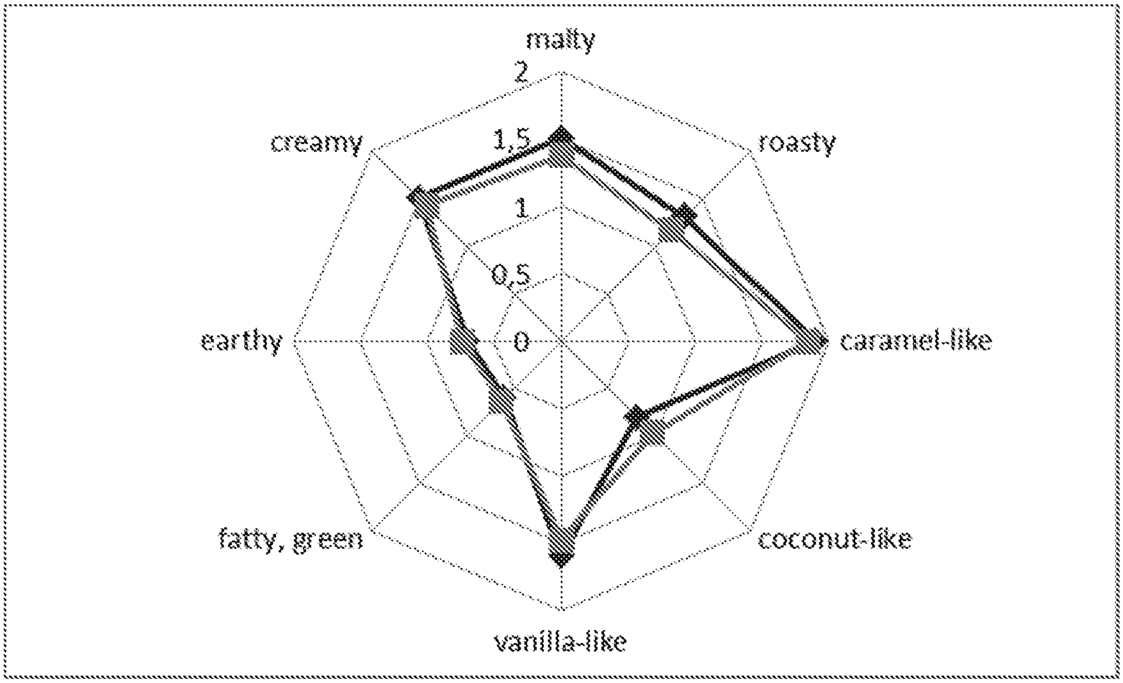

FIG. 3 provides a sensory profile analysis of dry mix chocolate (diamonds) and its corresponding recombinant (squares).

5. DETAILED DESCRIPTION OF THE INVENTION

To date, there remains a need for a method of manufacturing fat-based confections made from dry chocolate mix that is more representative of the characteristic flavor associated with a fat-based confection made from chocolate crumb powder, without the need for creating or using a chocolate crumb powder. The present flavor compositions provide an alternative method for achieving crumb chocolate flavor. The presently disclosed subject matter allows for specifying particular notes in the flavoring compositions and methods of their preparation to reflect the aroma and creaminess associated with crumb chocolate.

For clarity and not by way of limitation, this detailed description is divided into the following sub-portions:

5.1. Definitions;

5.2. Crumb chocolate flavor compositions;

5.3. Chocolate Compositions and Products; and 5.4. Methods of measuring taste and texture attributes.

5.1. Definitions

The terms used in this specification generally have their ordinary meanings in the art, within the context of this invention and in the specific context where each term is used. Certain terms are discussed below, or elsewhere in the specification, to provide additional guidance to the practitioner in describing the compositions and methods of the invention and how to make and use them.

As used herein, the use of the word "a" or "an" when used in conjunction with the term "comprising" in the claims and/or the specification can mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

As used herein, "fat-based" refers to a material having a fat or lipid continuous phase in which material components such as, for example, milk proteins and sugars are dispersed.

As used herein, the term "chocolate" is intended to refer to all chocolate or chocolate-like compositions with a fat phase or fat-like composition. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, aerated chocolates, compound coatings, non-standardized chocolates and chocolate-like compositions, unless specifically identified otherwise. Chocolate-like products include, for example, imitation chocolate that has cocoa butter replaced with other fats. In the United States, chocolate is subject to a standard of identity established by the U.S. Food and Drug Administration (FDA) under the Federal Food, Drug and Cosmetic Act. Definitions and standards for the various types of chocolate are well established in the U.S. Nonstandardized chocolates are those chocolates which have compositions that fall outside the specified ranges of the standardized chocolates.

As used herein, the term "chocolate-flavored confection" refers to food products, excluding "chocolate", having a chocolate flavor/aroma and comprising a cocoa fraction. These products are stable at ambient temperatures for extended periods of time (e.g., greater than 1 week) and are characterized as microbiologically shelf-stable at 18-30° C. under normal atmospheric conditions. Examples include chocolate-flavored hard candies, chewables, chewing gums, etc.

As used herein, the term "chocolate-flavored compositions" refers to chocolate-flavored compositions, excluding "chocolate", containing a cocoa fraction and having a chocolate flavor/aroma. Examples include chocolate-flavored cake mixes, ice creams, syrups, baking goods, etc. The term includes chocolate-flavored compositions (e.g., cakes, nougats, puddings, etc.), as well as compositions not having a chocolate-flavor (e.g., caramels, etc.).

As used herein, "chocolate crumb powder" or "crumb powder" refers to a compound ingredient for making crumb chocolate. Chocolate crumb powder is made from a blend of sugar, milk and/or other dairy ingredients and cocoa mass (cocoa liquor) which is concentrated to a moisture content of around 1% by means of a drying step such as a multiple-step evaporator and under vacuum conditions (i.e., crumbing process). The dried compound ingredient can then be milled to form a powder. The chocolate crumb powder can be stored until an appropriate time for use in making crumb chocolate.

As used herein, "crumb chocolate" or "CGC" refers to a fat-based confection, such as a milk chocolate, made with chocolate crumb powder. In certain embodiments, the crumb process generates a creamier milk chocolate (i.e., a milk chocolate with a taste profile characteristic of crumb chocolate) as compared to dry mix chocolate without chocolate crumb powder.

As used herein, "dry mix chocolate" or "DMGC" refers to a milk chocolate made with milk powder and without chocolate crumb powder or without the crumb process.

As used herein, "chocolate admixture" or "chocolate composition" refers to an admixture or composition that is admixed or combined with a dry mix chocolate or other chocolate base with a flavor composition.

As used herein, "admixing the product or food product with a flavor composition" refers to the process where an extraneous flavor composition is mixed with or added to a completed product (i.e., end product or food product) or mixed with some or all of the components of the product during product formation (i.e., an admixture) or some combination of these steps. When used in the context of admixing the term "product" refers to the end product or any of its components. This admixing step can include a process selected from the step of adding the flavor to the product, spraying the flavor on the product, coating the flavor on the product, suspending the product in the flavor, painting the flavor on the product, pasting the flavor on the product, encapsulating the product with the flavor, mixing the flavor with the product and any combination thereof. The flavor composition can be a liquid, dry powder, spray, paste, suspension and any combination thereof.

As used herein "food product" refers to an ingestible product, such as, but not limited to, human food, animal (pet) foods, and pharmaceutical compositions.

As used herein "flavor composition" refers to at least one, two, three, four, five, or more compounds or biologically acceptable salts thereof that modulate, including enhancing, multiplying, potentiating, decreasing, suppressing, or inducing, the tastes, smells and/or flavors of a natural or synthetic tastant, flavoring agent, taste profile, flavor profile and/or texture profile in an animal or a human. In certain embodiments, the flavor composition comprises a combination of compounds or biologically acceptable salts thereof. In certain embodiments, the flavor composition includes one or more excipients.

As used herein, "extraneous flavor composition" refers to the chocolate crumb flavor compositions of the presently disclosed subject matter.

As used herein, "taste" refers to a sensation caused by activation or inhibition of receptor cells in a subject's taste buds. In certain embodiments, taste can be selected from the group consisting of sweet, sour, salt, bitter, kokumi and umami. In certain embodiments, a taste is elicited in a subject by a "tastant." In certain embodiments, a tastant is a synthetic tastant. In certain embodiments, the tastant is prepared from a natural source.

As used herein, "taste profile" refers to a combination of tastes, such as, for example, one or more of a sweet, sour, salt, bitter, kokumi and/or umami taste. In certain embodiments, a taste profile is produced by one or more tastant that is present in a composition at the same or different concentrations. In certain embodiments, a taste profile refers to the intensity of a taste or combination of tastes, for example, a sweet, sour, salt, bitter, kokumi and/or umami taste, as detected by a subject or any assay known in the art. In certain embodiments, modifying, changing or varying the combination of tastants in a taste profile can change the sensory experience of a subject.

As used herein, "flavors" shall include odors, odorants, and/or tastes. The terms "flavor" and "aroma" are synonymous and are used interchangeably. In certain non-limiting embodiments, the sensory experience of a subject exposed to a flavor can be classified as a characteristic experience for the particular flavor. For example, a flavor can be identified by the subject as being, but not limited to, a floral, citrus, berry, nutty, caramel, chocolate, peppery, smoky, cheesy, meaty, etc. flavor As used herein, a flavor composition can be selected from a liquid, dry powder, spray, paste, suspension and any combination thereof. The flavor can be a natural composition, an artificial composition, a nature identical, or any combination thereof.

As used herein, "flavor profile" refers to a combination of sensory stimuli, for example, tastes, such as sweet, sour, bitter, salty, kokumi and/or umami tastes, and/or olfactory, tactile and/or thermal stimuli. In certain embodiments, the flavor profile comprises one or more flavors which contribute to the sensory experience of a subject. In certain embodiments, modifying, changing or varying the combination of stimuli in a flavor profile can change the sensory experience of a subject.

As used herein, "sensory experience" refers to a subject's sensory perception of a taste, taste profile, flavor, flavor profile or texture profile.

As used herein, "texture profile" or "mouthfeel" refers to a composition's physical and chemical interaction in the mouth. The texture profile of a composition can include one or more texture, such as, for example, but not limited to, astringency, hardness, cohesiveness, viscosity, elasticity, adhesiveness, brittleness, chewiness, gumminess, moisture content, grittiness, smoothness, oiliness and greasiness. In certain embodiments, the texture profile can comprise one or more texture characteristic in the same or different intensities. In certain embodiments, the texture profile can remain constant or change during a sensory experience, for example, from initial perception of a composition on the palate, to first bite, through mastication and finally, the act of swallowing.

As used herein, "creaminess" refers to a flavor profile attribute that can be manipulated by odorants and/or flavorings that elicit a creamy aroma or flavor. In certain embodiments, the "creaminess" of a compound can be influenced by fat content, viscosity, particle size, smoothness, consistency, and thickness. In one embodiment, there is a positive correlation of flavor notes like cream, vanilla, coconut, and caramel to "creaminess". One reference food that can be used for sensory panelist training of "creaminess" is whipped, pasteurized cream.

5.2. Crumb Chocolate Flavor Compositions

In the presently disclosed subject matter, the flavor compositions include a combination of compounds to establish a crumb chocolate flavor in a food product, for example, a fat based confectionery such as a chocolate product.

5.2.1. Flavor Compounds

The flavor composition of the presently disclosed subject matter comprises one or more of the following flavor compounds (which are also referred to as odorant compounds):

(a) at least one highly volatile compound;

(b) at least one lactone compound; and/or (c) at least caramelic compound.

The amount of each component in the flavor composition varies depending on the potency of each compound. The amount of each compound employed in the flavor composition is an effective amount to provide a flavor composition that exhibits a sensory effect. The contribution and potency adjustments maintain the flavoring composition's balance. With respect to the contribution to the character of the flavor composition of the presently disclosed subject matter, all of the three groups could be present, two or the groups could be present, or only one of the groups of compounds could be present in the finalized crumb chocolate flavor composition.

The overall flavor of a food product results from influences of taste substances and odorants. The latter are volatile compounds with a molecular weight <300 Da and a high vapor pressure. These molecules are taken up by the olfactory receptors in the olfactory epithelium (region olfactoria) in the upper nasal cavity. Odorants can characterize a food, and while they are quantitatively detectable as a whole in a range of 10-50 mg/kg, only a small amount of all occurring odorants are important for the food aroma.

The complex composition of a chocolate's aroma is affected by the genotype of the cocoa beans used, added ingredients, and each step of production. Schnermann et al.

(*J. Agric. Food Chem.*, 1997, 45 (3), pp 867-872) analyzed odorants of milk chocolate by means of gas chromatography olfactometry and aroma extract dilution analysis (AEDA) in hopes to identify key odorants to the overall aroma of chocolate. Thirty-seven odor-active volatiles were orthonasally perceived in the neutral-basic fraction. Twelve of these odorants showed a flavor dilution-factor (FD-factor) of at least 512 and are, for that reason, considered important for the overall chocolate aroma. Next the mushroom-like 1-octen-3-one and the 2-ethyl-3,5-dimethylpyrazine (potato-chip-like), and also the sweet and peach-like R-δ-decalactone and 2- and 3-methylbutanoic acid of the acidic fraction were considered decisive factors of the overall flavor. Most of the detected odorants originated from the used cocoa paste which was separately analyzed by AEDA. The difference in the FD-factor of dimethyl trisulfide and 4-hydroxy-2,5-dimethyl-3(2H)-furanone in milk chocolate (FD-256; 128) and cocoa mass (FD: 32, <8) respectively might result from additional formation processes at higher temperatures during conching of the chocolate.

Schmitt et al. (TU München, Garching, 2005) investigated the role of different ingredients as sources of key aroma compounds in crumb chocolate. This was done by the aroma activity value concept (sensomics procedure), with special emphasis on the crumb process. Fifteen odorants were identified, which could be considered important: Strecker aldehydes (2- and 3-methylbutanal, 2-methylpropanal), esters (ethyl 2- and ethyl-3 methylbutanoate), acids (butanoic acid, phenylacetic acid) and odorants, e.g., as 2-acetyl-1-pyrroline or dimethyl trisulfide. It could be shown that easy volatilized components were distinctly decreased during the crumb process, whereas 2-acetyl-1-pyrroline, 4-hydroxy-2,5-dimethyl-3(2H)-furanone, 3-(methylthio)propionaldehyde and 2,3-butanedione were generated.

A. Highly Volatile Compounds

Highly volatile compounds are odorants that have a high vapor pressure at ordinary room temperatures. In certain embodiments, the highly volatile compound has a vapor pressure greater than 0.001 kPa (20° C.). Highly volatile compounds are known in the art to contribute to the aroma of chocolate. However, given the volatilely of these compounds, it is unexpected that they would contribute to crumb chocolate flavor given the heat treatment involved in the crumb making process. The Table below provides various non-limiting highly volatile compounds in chocolate and their respective odor quality.

TABLE 1

Highly Volatile Compounds

| Odorant | Odor Quality |
|---|---|
| methanethiol | sulfurous |
| 2,3-butanedione | buttery |
| 2-methylbutanal | nutty |
| 3-methylbutanal | aldehydic/fatty |
| methylpropanal | spicy/floral |

In certain embodiments, at least one highly volatile compound (or combinations thereof) is comprised in the crumb chocolate flavor composition disclosed herein. For example, the crumb chocolate flavor compositions contain one or more of the highly volatile compounds described by Table 1. In certain non-limiting embodiments, the highly volatile compound is comprised in the crumb chocolate flavor composition of the presently disclosed subject matter in an amount effective to provide an overall crumb chocolate aroma, a creamy aroma, or a combination thereof. The amount of the highly volatile compound present in the flavor composition can vary depending on the potency of the compound.

In one embodiment, the highly volatile compound is present in an amount of from about 0.01 μg/kg to about 650 μg/kg of a chocolate composition (e.g., dry mix chocolate admixed with the crumb chocolate flavor composition as described herein). In certain embodiments, the highly volatile compound is present in a concentration of from about 0.01 μg/kg to about 550 μg/kg, from about 0.1 μg/kg to about 450 μg/kg, from about 0.5 μg/kg to about 350 μg/kg, from about 1 μg/kg to about 250 μg/kg, from about 5 μg/kg to about 150 μg/kg, or from about 10 μg/kg to about 100 μg/kg of the chocolate composition. In certain embodiments the highly volatile compound is present at a concentration of at least about 1 μg/kg, at least about 25 μg/kg, at least about 143 μg/kg, or at least about 181 μg/kg of the chocolate composition.

In certain embodiments, the highly volatile compound is present in an amount of from about 0.01 μg/kg to about 3 μg/kg, or from about 10 μg/kg to about 70 μg/kg, or from about 75 μg/kg to about 250 μg/kg, or from about 80 to about 300 μg/kg of the chocolate composition. In certain embodiments, the highly volatile compound is present from about 1.0 μg/kg to about 1.4 μg/kg, or from 25 μg/kg to about 34 μg/kg, or from 143 μg/kg to about 193 μg/kg, or from about 181 μg/kg to about 246 μg/kg of the chocolate composition.

In one embodiment, the highly volatile compound is present in an amount of from about 0.001% to about 25% weight/weight (w/w), from about 0.002% to about 23% w/w, from about 0.003% to about 21% w/w, from about 0.004% to about 19% w/w, from about 0.005% to about 17% w/w, or from about 0.01% to about 15% w/w of the flavor composition. In certain embodiments, the highly volatile compound is present in an amount of at least about 0.005% w/w, at least about 0.1% w/w, at least about 0.7% w/w, or at least about 0.9% w/w of the flavor composition.

In certain embodiments, the highly volatile compound is present in an amount of from about 0.001% to about 0.1% w/w, from about 0.01% to about 5% w/w, or from about 0.01% to about 10% w/w. In certain embodiments, the highly volatile compound is present in an amount of from about 0.005% to about 0.007% w/w, or from about 0.13% to 0.17% w/w, or from about 0.72% to about 0.97% w/w, or from about 0.91% to about 1.2% w/w of the flavor composition.

In one non-limiting embodiment, methanethiol is the highly volatile compound and is present in a concentration from about 0.01 μg/kg to about 3 μg/kg or about 1.0 μg/kg to about 1.4 μg/kg of the chocolate composition. In certain embodiments, methanethiol is present in a concentration of about 0.45 μg/kg or about 1.2 μg/kg of the chocolate composition.

In one embodiment, methanethiol is the highly volatile compound and is present in an amount from about 0.001% to about 0.1% w/w or from about 0.005% to about 0.007% w/w of the flavor composition. In one embodiment, methanethiol is present in an amount of about 0.08% w/w or about 0.006% w/w or about 0.03% w/w of the flavor composition.

B. Lactone Compounds

Various lactone compounds are known in the art to be responsible for specific scents. Table 2 below provides, as an embodiment of the present invention, various non-limiting lactone groups and their respective odor quality.

TABLE 2

| Lactone Compounds | |
|---|---|
| Odorant | Odor Quality |
| δ-dodecalactone | tropical/fruity |
| δ-decalactone | coconut/fruity |
| γ-nonalactone | coconut |
| δ-octalactone | coconut |
| γ-undecalactone | fruity/peach |

In certain embodiments, at least one lactone compound (or combinations thereof) is comprised in the crumb chocolate flavor composition, for example, one or more of the lactone compounds described by Table 2. In certain embodiments, the one or more lactone compounds is selected from the group consisting of δ-valerolactone, γ-valerolactone, δ-hexalactone, γ-hexalactone, δ-heptalactone, γ-heptalactone, γ-octalactone, δ-octenolactone, δ-nonalactone, γ-decalactone, δ-decenolactone (massoia lactone), 6-undecalactone, γ-dodecalactone, 5-butyldihydro-4-methylfuran-2(3H)-one (whiskey lactone), 6-pentylpyran-2-one, and combinations thereof. In certain non-limiting embodiments, the lactone compound is comprised in the flavor composition of the presently disclosed subject matter in an amount effective to provide an overall crumb chocolate aroma, a creamy aroma, or a combination thereof. The amount of the lactone compound present in the flavor composition can vary depending on the potency of the compound.

In one embodiment, the lactone compound is present in a concentration of from about 1 μg/kg to about 4415 μg/kg of a chocolate composition (e.g., dry mix chocolate admixed with the crumb chocolate flavor composition as described herein). In certain embodiments, the lactone compound is present in a concentration of from about 5 μg/kg to about 3500 μg/kg, from about 10 μg/kg to about 3000 μg/kg, from about 15 μg/kg to about 2500 μg/kg, from about 20 μg/kg to about 2000 μg/kg, from about 25 μg/kg to about 1500 μg/kg, or from about 50 μg/kg to about 1000 μg/kg, of the chocolate composition. In certain embodiments, the lactone compound is present in a concentration of at least about 18 μg/kg, at least about 45 μg/kg, at least about 79 μg/kg, at least about 365 μg/kg, or at least about 2156 μg/kg of the chocolate composition.

In certain embodiments, the lactone compound is present in an amount of from about 350 μg/kg to about 3500 μg/kg, or from about 35 μg/kg to about 600 μg/kg, or from about 20 μg/kg to about 80 μg/kg, or from about 25 μg/kg to about 200 μg/kg, or from about 1 μg/kg to about 35 μg/kg of the chocolate composition. In certain embodiments, the lactone compound is present in an amount of from about 2156 μg/kg to about 2917 μg/kg, or from about 365 μg/kg to about 494 μg/kg, or from about 45 μg/kg to about 61 μg/kg, or from about 79 μg/kg to about 107 μg/kg, or from about 18 μg/kg to about 25 μg/kg of the chocolate composition.

In one embodiment, the lactone compound is present in an amount of from about 0.01% to about 98% w/w of the flavor composition. In certain embodiments, the lactone compound is present in an amount of from about 0.2% to about 80% w/w, from about 0.3% to about 60% w/w, from about 0.4% to about 40% w/w, or from about 0.5% to about 25% w/w of the composition. In certain embodiments, the lactone is present in an amount of at least about 0.09% w/w, at least about 0.2% w/w, at least about 0.4% w/w, at least about 1.8% w/w, or at least about 10.8% w/w of the flavor composition.

In certain embodiments, the lactone compound is present in an amount of from about 5% to 80% w/w, or from about 0.5% to 15% w/w, or from about 0.05% to about 5% w/w, or from about 0.1% to about 3% w/w, or from about 0.01% to about 1% w/w of the flavor composition. In certain embodiments, the lactone compound is present in an amount of from about 10.8% to about 14.6% w/w, or from about 1.8% to about 2.5% w/w, or from about 0.23% to about 0.30% w/w, or from about 0.40% to about 0.54% w/w, or from about 0.09% to about 0.12% w/w of the flavor composition.

In one embodiment, the lactone comprises δ-dodecalactone, which is present in a concentration from about 350 to about 3500 μg/kg or from about 2156 μg/kg to about 2917 μg/kg of the chocolate composition. In certain embodiments, the 6-dodecalactone is present in a concentration of about 2536 μg/kg or about 408 μg/kg of the chocolate admixture composition.

In one embodiment, the δ-dodecalactone is present in an amount from about 5% to about 80% w/w or from about 10.8% to about 14.6% w/w of the flavor composition. In certain embodiments, the δ-dodecalactone is present in an amount of about 12.7% w/w or about 69% w/w or about 73% w/w of the flavor composition.

In one embodiment, the lactone comprises δ-decalactone, which is present in a concentration of from about 35 μg/kg to about 600 μg/kg or from about 365 μg/kg to about 494 μg/kg of the chocolate composition. In certain embodiments, the 6-decalactone is present in a concentration of about 430 μg/kg or about 42 μg/kg of the chocolate composition.

In one embodiment, the δ-decalactone is present in an amount from about 0.5% to about 15% w/w or from about 1.8% to about 2.5% w/w of the flavor composition. In certain embodiments, the δ-decalactone is present in an amount of about 2.2% w/w or about 7.1% w/w or about 12.3% w/w of the flavor composition.

In one embodiment, the lactone comprises γ-nonalactone, which is present in a concentration from about 20 μg/kg to about 80 μg/kg or from about 45 μg/kg to about 61 μg/kg of the chocolate composition. In certain embodiments, the γ-nonalactone is present in a concentration of about 53 μg/kg or about 23 μg/kg of the chocolate composition.

In one embodiment, the γ-nonalactone is present in an amount from about 0.05% to about 5% w/w or about 0.23% to about 0.30% w/w of the flavor composition. In certain embodiments, the γ-nonalactone is present in an amount of about 0.27% w/w or about 3.9% w/w or about 1.5% w/w of the flavor composition.

In one embodiment, the lactone comprises δ-octalactone, which is present in a concentration from about 1 μg/kg to about 200 μg/kg or from about 79 μg/kg to about 107 μg/kg of the chocolate composition. In certain embodiments, the δ-octalactone is present in a concentration of about 93 μg/kg or about 4 μg/kg of the chocolate composition.

In one embodiment, the δ-octalactone is present in an amount from about 0.1% to about 3% w/w or about 0.40% to about 0.54% w/w of the flavor composition. In certain embodiments, the δ-octalactone is present in an amount of about 0.46% w/w or about 0.7% w/w or about 2.7% w/w of the flavor composition.

In one embodiment, the lactone comprises γ-undecalactone, which is present in a concentration from about 1 μg/kg to about 35 μg/kg or from about 18 μg/kg to about 25 μg/kg of the chocolate composition. In certain embodiments, the γ-undecalactone is present in a concentration of about 21.7 μg/kg or about 1.3 μg/kg of the chocolate composition.

In one embodiment, the γ-undecalactone is present in an amount from about 0.01% to about 1% w/w or from about 0.09% to about 0.12% w/w of the flavor composition. In certain embodiments, the γ-undecalactone is present in an amount of about 0.11% w/w or about 0.2% w/w or about 0.6% w/w of the flavor composition.

C. Caramelic Compounds

Caramelic reaction products or compounds (e.g., Maillard products and/or Strecker aldehydes) arise during thermal treatment of ingredients used to make crumb chocolate (i.e., during the crumbing process). For example, the thermal treatment processes used to create crumb powder results in the production of many Maillard products, such as dimethylhydroxy furanone (4-hydroxy-2,5-dimethyl-3(2H)-furanone, or furaneol) and maltol (3-hydroxy-2-methyl-4H-pyran-4-one); Strecker aldehydes or Strecker aldehyde products such as phenylacetaldehyde; methanethiol; various pyrazines; ethyl phenyl acetate and 3-methylindole. The Table below provides various non-limiting caramelic compounds and their respective odor quality.

TABLE 3

| Caramelic Compounds | |
|---|---|
| Odorant | Odor Quality |
| dimethylhydroxy furanone | caramel-like |
| phenylacetaldehyde | green/sweet floral |
| maltol | caramel-like |

In certain embodiments, the crumb chocolate flavor composition comprises a caramelic composition that comprises at least one or more caramelic compounds (or combinations thereof). In certain non-limiting embodiments, the caramelic composition is present in the flavor composition of the presently disclosed subject matter in an amount effective to provide an overall crumb chocolate aroma, a creamy aroma, or a combination thereof. The amount of the caramelic composition present in the flavor composition can vary depending on the potency of the compound.

In one embodiment, the caramelic compound composition is present in a concentration of from about 1 μg/kg to about 600 μg/kg of a chocolate admixture composition (e.g., dry mix chocolate admixed with the crumb chocolate flavor composition as described herein). In certain embodiments, the caramelic composition compound is present in a concentration of from about 1 μg/kg to about 500 μg/kg, from about 2 μg/kg to about 400 μg/kg, from about 5 μg/kg to about 300 μg/kg, from about 10 μg/kg to about 200 μg/kg, or from about 20 μg/kg to about 100 μg/kg of the chocolate admixture composition.

In certain embodiments, the caramelic compound composition is present in a concentration of from about 100 μg/kg to about 300 μg/kg, from about 1 μg/kg to about 20 μg/kg, or from about 1 μg/kg to about 250 μg/kg of the chocolate admixture composition. In certain embodiments, the caramelic compound composition is present from about 155 μg/kg to about 210 μg/kg, or from about 8.6 μg/kg to about 11.6 μg/kg, or from about 134 μg/kg to about 182 μg/kg of the chocolate admixture composition.

In one embodiment, the caramelic composition is present in an amount of from about 0.005% w/w to about 25% w/w, from about 0.005% w/w to about 20% w/w, from about 0.01% w/w to about 15% w/w, from about 0.05% w/w to about 10% w/w, from about 0.1% w/w to about 5% w/w, or from about 0.5% w/w to about 1% w/w of the flavor composition.

In certain embodiments, the caramelic compound is present in an amount from about 0.1% to about 20% w/w, or from about 0.005% to about 1% w/w, or from about 0.1% to about 5% w/w of the flavor composition. In certain embodiments, the caramelic compound is present in an amount from about 0.78% to about 1.1% w/w, or from about 0.043% to about 0.058% w/w, or from about 0.67% to about 0.91% w/w of the flavor composition.

In one embodiment, the caramelic composition comprises dimethylhydroxy furanone, which is present in a concentration from about 100 μg/kg to about 300 μg/kg or about 155 μg/kg to about 210 μg/kg of the chocolate composition. In certain embodiments, the dimethylhydroxy furanone is present in a concentration of about 183 μg/kg or about 110 μg/kg of the chocolate composition.

In one embodiment, the dimethylhydroxy furanone is present in an amount from about 0.1% to about 20% w/w or about 0.78% to about 1.1% w/w of the flavor composition. In certain embodiments, the dimethylhydroxy furanone is present in an amount of about 0.92% w/w or about 18.5% w/w or about 5.2% w/w of the flavor composition.

In one embodiment, the caramelic composition comprises phenylacetaldehyde, which is present in a concentration from about 1 μg/kg to about 20 μg/kg or from about 8.6 μg/kg to about 11.6 μg/kg of the chocolate composition. In certain embodiments, the phenylacetaldehyde is present in a concentration of about 10.1 μg/kg or about 3.6 μg/kg of the chocolate composition.

In one embodiment, the phenylacetaldehyde is present in an amount from about 0.005% to about 1% w/w or about 0.043% to about 0.058% w/w of the flavor composition. In certain embodiments, the phenylacetaldehyde is present in an amount of about 0.051% w/w or about 0.6% w/w or about 0.3% w/w of the flavor composition.

In one embodiment, the caramelic composition comprises maltol, which is present in a concentration from about 1 μg/kg to about 250 μg/kg or from about 134 μg/kg to about 182 μg/kg of the chocolate composition. In certain embodiments, the maltol is present in a concentration of about 158 μg/kg or about 2 μg/kg of the chocolate composition.

In one embodiment, the maltol is present in an amount from about 0.1% to about 5% w/w or from about 0.67% to about 0.91% w/w of the flavor composition. In certain embodiments, the maltol is present in an amount of about 0.79% w/w or about 0.3% w/w or about 4.5% of the flavor composition.

5.2.2. Crumb Chocolate Flavor Composition Blends

The present disclosure relates to crumb chocolate flavor compositions that can be admixed with dry mix chocolate, or a fat-based confection made with dry mix chocolate to form a chocolate composition, to impart a crumb chocolate flavor without the use of crumb chocolate, and thereby avoiding the laborious and costly drying step used to make crumb chocolate. The crumb chocolate flavor compositions can also be admixed with other fat-based confections to provide the aroma or creaminess of a crumb chocolate flavor.

In certain embodiments, the crumb chocolate flavor composition includes at least one highly volatile compound. In certain embodiments, the at least one highly volatile compound is, for example, but not limited to, methanethiol, 2,3-butanedione, 2-methylbutanal, 3-methylbutanal, methylpropanal, and combinations thereof. In certain embodiments, the crumb chocolate flavor composition includes methanethiol, 2,3-butanedione, 2-methylbutanal, 3-methylbutanal, and methylpropanal. In certain embodiments, the crumb chocolate flavor composition includes methanethiol.

In certain embodiments, the crumb chocolate flavor composition includes at least one of the highly volatile compounds or combinations thereof according to Table 4 to provide the final admixture of the chocolate composition to have the concentration of the highly volatile compound or compounds within the indicated ranges. In certain embodiments, the crumb chocolate flavor composition provides the final chocolate composition to have between about 0.01 and about 3 μg/kg, based on the total weight of the chocolate composition, of methanethiol as the highly volatile compound.

TABLE 4

Highly Volatile Compounds for a Crumb Chocolate Flavor Composition

| Odorant | μg/kg of the Admixture | w/w % of the Flavor Composition |
|---|---|---|
| methanethiol | 0.01-3 | 0.001-0.1 |
| 2,3-butanedione | 10-70 | 0.01-5 |
| 2-methylbutanal | 75-250 | 0.01-10 |
| methylpropanal | 80-300 | 0.01-10 |

In certain embodiments, the crumb chocolate flavor composition includes at least one lactone compound. In certain embodiments, the at least one lactone compound is, for example, but not limited to, δ-dodecalactone, δ-decalactone, δ-octalactone, γ-nonalactone, γ-undecalactone, δ-valerolactone, γ-valerolactone, δ-hexalactone, γ-hexalactone, δ-heptalactone, γ-heptalactone, γ-octalactone, δ-octenolactone, δ-nonalactone, γ-decalactone, δ-decenolactone (massoia lactone), δ-undecalactone, γ-dodecalactone, 5-butyldihydro-4-methylfuran-2(3H)-one (whiskey lactone), 6-pentylpyran-2-one, and combinations thereof. In certain embodiments, the crumb chocolate flavor composition includes δ-dodecalactone, δ-decalactone, δ-octalactone, γ-nonalactone, and γ-undecalactone. In certain embodiments, the crumb chocolate flavor composition includes δ-dodecalactone.

In certain embodiments, the crumb chocolate flavor composition includes at least one of the lactone compounds or combinations thereof according to Table 5 to provide the final admixture of the chocolate composition to have the concentration of the lactone compound or compounds within the indicated ranges.

TABLE 5

Lactone Compounds for a Crumb Chocolate Flavor Composition

| Odorant | μg/kg of the Admixture | w/w % of the Flavor Composition |
|---|---|---|
| δ-dodecalactone | 350-3500 | 5-80 |
| δ-decalactone | 35-600 | 0.5-15 |
| γ-nonalactone | 20-80 | 0.05-5 |
| δ-octalactone | 1-200 | 0.1-3 |
| γ-undecalactone. | 1-35 | 0.01-1 |

In certain embodiments, the crumb chocolate flavor composition includes at least one caramelic compound. In certain embodiments, the at least one caramelic compound is, for example but not limited to, dimethylhydroxy furanone, phenylacetaldehyde, or maltol. In certain embodiments, the crumb chocolate flavor composition includes dimethylhydroxy furanone, phenylacetaldehyde, and maltol. In certain embodiments, the crumb chocolate flavor composition includes furaneol.

In certain embodiments, the crumb chocolate flavor composition includes at least one of the caramelic compounds according to Table 6 to provide the final admixture of the chocolate composition to have the concentration of the caramelic compounds within the indicated ranges.

TABLE 6

Caramelic Compounds for a Crumb Chocolate Flavor Composition

| Odorant | μg/kg of the Admixture | w/w % of the Flavor Composition |
|---|---|---|
| dimethylhydroxy furanone | 100-300 | 0.1-20 |
| phenylacetaldehyde | 1-20 | 0.005-1 |
| maltol | 1-250 | 0.1-5 |

In one embodiment, the crumb chocolate flavor composition includes at least one highly volatile compound, at least one lactone compound, and at least one caramelic compound.

In one embodiment, crumb chocolate flavor composition includes at least one highly volatile compound, at least one lactone compound, and a caramelic composition.

In certain embodiments, the crumb chocolate flavor composition includes at least one highly volatile compound selected from the group consisting of methanethiol, 2,3-butanedione, 2-methylbutanal, 3-methylbutanal, methylpropanal, and combinations thereof; at least one lactone compound selected from the group consisting of δ-dodecalactone, δ-decalactone, δ-octalactone, γ-nonalactone, γ-undecalactone, δ-valerolactone, γ-valerolactone, δ-hexalactone, γ-hexalactone, δ-heptalactone, γ-heptalactone, γ-octalactone, δ-octenolactone, δ-nonalactone, γ-decalactone, δ-decenolactone (massoia lactone), δ-undecalactone, γ-dodecalactone, 5-butyldihydro-4-methylfuran-2(3H)-one (whiskey lactone), 6-pentylpyran-2-one, and combinations thereof; and a caramelic composition that comprises at least one caramelic compound selected from the group consisting of dimethylhydroxy furanone, phenylacetaldehyde, maltol and combinations thereof. In certain embodiments, the at least one highly volatile compound is methanethiol.

In one embodiment, the crumb chocolate flavor composition includes furaneol, phenylacetaldehyde, maltol, methanethiol, δ-decalactone, δ-dodecalactone, δ-octalactone, γ-nonalactone, and γ-undecalactone.

In certain embodiments, the crumb chocolate flavor composition includes the compounds according to Table 7 to provide the final admixture of the chocolate composition to have the concentrations of the indicated compounds within the ranges.

TABLE 7

Crumb Chocolate Flavor Composition

| Odorant | μg/kg of the Admixture | w/w % of the Flavor Composition |
|---|---|---|
| dimethylhydroxy furanone (furaneol) | 100-300 | 0.1-20 |
| phenylacetaldehyde | 1-20 | 0.005-1 |
| maltol | 1-250 | 0.1-5 |

TABLE 7-continued

| Crumb Chocolate Flavor Composition | | |
|---|---|---|
| Odorant | μg/kg of the Admixture | w/w % of the Flavor Composition |
| methanethiol | 0.01-3 | 0.001-0.1 |
| δ-decalactone | 35-600 | 0.5-15 |
| δ-dodecalactone | 350-3500 | 5-80 |
| δ-octalactone | 1-200 | 0.1-3 |
| γ-nonalactone | 20-80 | 0.05-5 |
| γ-undecalactone | 1-35 | 0.01-1 |

In one embodiment, the crumb chocolate flavor composition includes all of the odorants, as described by Table 8, to provide the final admixture of the chocolate composition to have the concentrations of the indicated compounds within the ranges.

TABLE 8

| Crumb Chocolate Flavor Composition | | | | | | |
|---|---|---|---|---|---|---|
| Odorant | μg/kg[§] | at least μg/kg[§] | no more than μg/kg[§] | w/w %[t] | at least w/w %[t] | no more than w/w %[t] |
| methanethiol | 1.2 | 1.0 | 1.4 | 0.006 | 0.005 | 0.007 |
| 2,3-diethyl-5-methylpyrazine | 2.9 | 2.4 | 3.3 | 0.014 | 0.012 | 0.017 |
| dimethyl trisulfide | 3.2 | 2.8 | 3.7 | 0.016 | 0.014 | 0.019 |
| ethyl phenyl acetate | 3.6 | 3.0 | 4.1 | 0.018 | 0.015 | 0.021 |
| γ-octalactone | 5.6 | 4.7 | 6.4 | 0.028 | 0.024 | 0.032 |
| 3-ethyl-2,5-dimethylpyrazine b) | 6.5 | 5.5 | 7.5 | 0.033 | 0.028 | 0.038 |
| 2-ethyl-3,5-dimethylpyrazine b) | 8.2 | 7.0 | 9.5 | 0.041 | 0.035 | 0.047 |
| (E)-2-nonenal | 10 | 8.5 | 11.5 | 0.05 | 0.04 | 0.06 |
| trimethylpyrazine | 14.8 | 12.6 | 17 | 0.07 | 0.06 | 0.09 |
| γ-undecalactone | 21.7 | 18 | 25 | 0.11 | 0.09 | 0.12 |
| 2,3-butanedione | 30 | 25 | 34 | 0.15 | 0.13 | 0.17 |
| tetramethylpyrazine | 35 | 30 | 40 | 0.18 | 0.15 | 0.20 |
| γ-nonalactone | 53 | 45 | 61 | 0.27 | 0.23 | 0.30 |
| δ-octalactone | 93 | 79 | 107 | 0.46 | 0.40 | 0.54 |
| 2-methylbutanoic acid | 135 | 114 | 155 | 0.67 | 0.57 | 0.78 |
| vanillin | 167 | 142 | 192 | 0.84 | 0.71 | 0.96 |
| 2-methylbutanal | 168 | 143 | 193 | 0.84 | 0.72 | 0.97 |
| dimethylhydroxy furanone (furaneol) | 183 | 155 | 210 | 0.92 | 0.78 | 1.1 |
| octanoic acid | 190 | 161 | 218 | 0.95 | 0.81 | 1.1 |
| methylpropanal | 214 | 181 | 246 | 1.1 | 0.91 | 1.2 |
| nonanoic acid | 279 | 237 | 321 | 1.4 | 1.2 | 1.6 |
| 3-methylbutanoic acid | 312 | 265 | 358 | 1.6 | 1.3 | 1.8 |
| 3-methylbutanal | 385 | 327 | 423 | 1.9 | 1.6 | 2.2 |
| phenylacetic acid | 396 | 337 | 456 | 2.0 | 1.7 | 2.3 |
| δ-decalactone | 430 | 365 | 494 | 2.2 | 1.8 | 2.5 |
| butanoic acid | 504 | 428 | 580 | 2.5 | 2.2 | 2.9 |
| hexanoic acid | 731 | 622 | 841 | 3.7 | 3.1 | 4.2 |
| γ-dodecalactone | 1218 | 1035 | 1400 | 6.1 | 5.2 | 7.0 |
| δ-dodecalactone | 2536 | 2156 | 2917 | 12.7 | 10.8 | 14.6 |
| acetic acid | 11607 | 9866 | 13348 | 58 | 49 | 67 |
| phenylacetaldehyde | 10.1 | 8.6 | 11.6 | 0.051 | 0.043 | 0.058 |
| maltol | 158 | 134 | 182 | 0.79 | 0.67 | 0.91 |
| 1-octen-3-one | 2.0 | 1.7 | 2.3 | 0.01 | 0.008 | 0.011 |
| 3-methylindol | 2.2 | 1.9 | 2.6 | 0.011 | 0.009 | 0.13 |
| indol | 49 | 42 | 57 | 0.25 | 0.21 | 0.28 |

[§]of the admixture

[t]of the flavor composition

5.2.3. Delivery Systems

The flavor compositions of the present disclosure can be employed in liquid form, dried form, and/or solid form. When used in dried form, suitable drying means such as spray drying can be used. Alternatively, a flavoring composition can be encapsulated or absorbed onto water soluble materials, including but not limited to materials such as cellulose, starch, sugar, maltodextrin, gum arabic and so forth. The actual techniques for preparing such dried forms are well-known in the art, and can be applied to the presently disclosed subject matter.

The flavoring compositions of the presently disclosed subject matter can be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

In specific embodiments, as noted above, encapsulation techniques can be used to modify the flavor systems. In certain embodiments, flavor compositions, flavor components, or the entire flavor system can be fully or partially encapsulated. Encapsulating materials and/or techniques can be selected to determine the type of modification of the flavor system.

In specific embodiments, the encapsulating materials and/or techniques are selected to improve the stability of the flavor compositions, flavor components, or flavor systems; while in other embodiments the encapsulating materials and/or techniques are selected to modify the release profile of the flavor compositions, flavor components, or flavor systems.

Suitable encapsulating materials can include, but are not limited to, hydrocolloids such as alginates, pectins, agars, guar gums, celluloses, and the like, proteins, polyvinyl acetate, polyethylene, crosslinked polyvinyl pyrrolidone, polymethylmethacrylate, polylactidacid, polyhydroxyalkanoates, ethylcellulose, polyvinyl acetatephthalate, polyethylene glycol esters, methacrylicacid-co-methylmethacrylate, ethylene-vinylacetate (EVA) copolymer, and the like, and combinations thereof. Suitable encapsulating techniques can include, but are not limited to, spray coating, spray drying, spray chilling, absorption, adsorption, inclusion complexing (e.g., creating a flavor/cyclodextrin complex), coacervation, fluidized bed coating, or other process can be used to encapsulate an ingredient with an encapsulating material.

Encapsulated delivery systems can comprise a hydrophobic matrix of fat or wax surrounding a flavor composition core. The fats can be selected from any number of conventional materials such as fatty acids, glycerides or poly glycerol esters, sorbitol esters, and mixtures thereof. Examples of fatty acids include but are not limited to hydrogenated and partially hydrogenated vegetable oils such as palm oil, palm kernel oil, peanut oil, rapeseed oil, rice bran oil, soybean oil, cottonseed oil, sunflower oil, safflower oil, and mixtures thereof. Examples of glycerides include but are not limited to monoglycerides, diglycerides, and triglycerides.

Waxes useful can be chosen from the group consisting of natural and synthetic waxes, and mixtures thereof. Non-limiting examples include paraffin wax, petrolatum, carbowax, microcrystalline wax, beeswax, carnauba wax, candellila wax, lanolin, bayberry wax, sugarcane wax, spermaceti wax, rice bran wax, and mixtures thereof.

The fats and waxes can be use individually or in combination in amounts varying from about 10 to about 70%, and alternatively in amounts from about 30 to about 60%, by weight of the encapsulated system. When used in combination, the fat and wax are preferably present in a ratio from about 70:10 to 85:15, respectively.

Typical encapsulated flavoring agent or sweetening agent delivery systems are disclosed in U.S. Pat. Nos. 4,597,970 and 4,722,845.

5.2.4 Carriers, Matrices, Diluents, Additives and Additional Ingredients

Various carriers, matrices, diluents, additives and additional ingredients can be used depending on the specific flavor delivery system contemplated. For liquid systems, if the system is aqueous, solvents include but not limited to ethanol or propylene glycol. Where the liquid system is fat-based, the solvents are fat soluble solvents including but not limited to benzyl alcohol, triacetin, triethyl citrate, or vegetable oil.

For solid delivery systems, sugar, sugar derivatives, or solid fats can be used. Particular examples of suitable materials include but are not limited to sucrose, glucose, lactose, levulose, fructose, maltose, ribose, dextrose, isomalt, sorbitol, mannitol, xylitol, lactitol, maltitol, pentatol, arabinose, pentose, xylose, galactose, hydrogenated starch hydrolysates, maltodextrin, Stabilite (SPI Polyols, USA), agar, carrageenan, other gums, polydextrose and derivatives and mixtures thereof. In particular embodiments, carbohydrates such as sucrose are maltodextrin are used. For solid fat systems, hydrogenated fats, shortenings, palm oils, coconut oils, cocoa butters and combinations thereof can be used.

5.3. Chocolate Compositions and End Products

The crumb chocolate flavoring compositions of the presently disclosed subject matter can be used in a wide variety of products that include chocolate compositions or admixtures and end products that are ingestible vehicles.

Crumb chocolate flavoring compositions can be combined with dry mix chocolate or similar chocolate base to form chocolate compositions or admixtures. The chocolate compositions can then be used in various end products that are ingestible.

In other embodiments, the crumb chocolate flavoring composition can be admixed with an end product, such as a food product. In certain embodiments, the end product is a food product that is a fat-based confectionery, for example, a fat-based confectionery made with dry mix chocolate. In certain embodiments, the food product is a fat-based confectionery, for example, a fat-based confectionery made without crumb chocolate.

Non-limiting examples of products that are suitable ingestible vehicles include dry mix chocolate and fat-based confections made with dry mix chocolate, and fat-based confections such as chocolate and cocoa liquor. The combination of the crumb chocolate flavor composition of the presently disclosed subject matter together with an ingestible vehicle and optional ingredients, when desired, provides a flavoring agent that possesses unexpected taste, flavor and/or texture value and imparts, for example, a crumb chocolate sensory experience.

As noted above, the crumb chocolate flavor compositions contain one or more odorants in effective amounts to provide an overall crumb chocolate aroma, a creamy aroma, or a combination thereof. The effective amounts are provided as weight percentages of the individual odorants in the crumb chocolate flavor compositions. Also provided are the effective amounts of the odorants in μg per kg of a chocolate composition.

In certain embodiments, the crumb chocolate flavor composition is admixed to a product (e.g., dry mix chocolate to form a chocolate composition or end product) at a concentration between about 500 μg/kg to about 5000 μg/kg of the chocolate composition. In certain embodiments, the flavor composition is admixed to the product (e.g., dry mix chocolate) at a concentration from about 525 μg/kg to about 4500 μg/kg, from about 550 μg/kg to about 4000 μg/kg, from about 575 μg/kg to about 3500 μg/kg, or from about 600 μg/kg to about 3000 μg/kg of the composition. In certain embodiments, the flavor composition is admixed to the product at a concentration from about 500 μg/kg to about 700 μg/kg or from about 3000 μg/kg to about 4000 μg/kg of the composition.

In certain embodiments, the flavor composition is admixed to the product (e.g., dry mix chocolate) at a concentration from about 0.00005% w/w to about 20% w/w of the product. In certain embodiments, the flavor composition is admixed to the product at a concentration from about 0.0001% w/w to about 17% w/w, from about 0.0005% w/w to about 15% w/w, from about 0.001% w/w to about 12% w/w, from about 0.005% w/w to about 10% w/w, from about 0.01% w/w to about 7% w/w, from about 0.05% w/w to about 5% w/w, from about 0.1% w/w to about 2% w/w, or from about 0.5% w/w to about 1% w/w of the admixture.

In certain embodiments, the flavor composition is admixed to the product at a concentration from about 0.005% w/w to about 3% w/w or from about 0.01% w/w to about 2% w/w of the product.

In the method for flavoring an ingestible composition of the presently disclosed subject matter, the ingestible composition is prepared by admixing the crumb chocolate flavor composition in an ingestible vehicle, together with any optional ingredients, to form, for example, a uniform mixture. The final compositions are readily prepared using standard methods and apparatus generally known by those skilled in the corresponding arts, such as confectionery arts. The apparatus useful in accordance with the presently disclosed subject matter comprises mixing apparatus well known in the art, and therefore the selection of the specific apparatus will be apparent to the artisan.

In certain embodiments, the present application relates to the modified edible food products produced by the methods disclosed herein. In certain embodiments, the food products can be produced by processes for producing comestible products well known to those of ordinary skill in the art, wherein the flavor composition of the present application is employed as a crumb chocolate flavor enhancer for the food product.

5.3.1. Chocolates and Fillings

The presently disclosed subject matter is also used with and/or in chocolate products, chocolate-flavored confections, and chocolate flavored compositions. Chocolates also include those containing dry mix chocolate solids or solids fully or partially made by a dry mix chocolate process. Various chocolates are disclosed, for example, in U.S. Pat. Nos. 7,968,140 and 8,263,168. A general discussion of the composition and preparation of chocolate confections can be found in B. W. Minifie, Chocolate, Cocoa and Confectionery: Science and Technology, 2nd edition, AVI Publishing Co., Inc., Westport, Conn. (1982).

Nonstandardized chocolates result when, for example, the nutritive carbohydrate sweetener is replaced partially or completely; or when the cocoa butter, cocoa butter alternative, cocoa butter equivalent, cocoa butter extender, cocoa butter replacer, cocoa butter substitute or milkfat are replaced partially or completely; or when components that have flavors that imitate milk, butter or chocolate are added or other additions or deletions in formula are made outside the FDA standards of identify of chocolate or combinations thereof. Chocolate-like compositions are those fat-based compositions that can be used as substitutes for chocolate in applications such as panning, molding, or enrobing; for example, carob.

The chocolate can contain a sugar syrup/solids, invert sugar, hydrolyzed lactose, maple sugar, brown sugar, molasses, honey, sugar substitute and the like. The term "sugar substitute" includes bulking agents, sugar alcohols (polyols such as glycerol), or high potency sweeteners or combinations thereof. Nutritive carbohydrate sweeteners with varying degrees of sweetness intensity can be any of those typically used in the art and include, but are not limited to, sucrose, e.g,. from cane or beet, dextrose, fructose, lactose, maltose, glucose syrup solids, corn syrup solids, invert sugar, hydrolyzed lactose, honey, maple sugar, brown sugar, molasses and the like. Sugar substitutes can partially replace the nutritive carbohydrate sweetener. High potency sweeteners include aspartame, cyclamates, saccharin, acesulfame-K, neohesperidin dihydrochalcone, sucralose, alitame, *stevia* sweeteners, glycyrrhizin, thaumatin and the like and mixtures thereof. The preferred high potency sweeteners are aspartame, cyclamates, saccharin, and acesulfame-K. Examples of sugar alcohols can be any of those typically used in the art and include sorbitol, mannitol, xylitol, maltitol, isomalt, lactitol and the like.

The chocolates can also contain bulking agents. The term "bulking agents" as defined herein can be any of those typically used in the art and include polydextrose, cellulose and its derivatives, maltodextrin, gum arabic, and the like.

The chocolate products can contain emulsifiers. Examples of safe and suitable emulsifiers can be any of those typically used in the art and include lecithin derived from vegetable sources such as soybean, safflower, corn, etc., fractionated lecithins enriched in either phosphatidyl choline or phosphatidyl ethanolamine, or both, mono- and digylcerides, diacetyl tartaric acid esters of mono- and diglycerides (also referred to as DATEM), monosodium phosphate derivatives of mono- and diglycerides of edible fats or oils, sorbitan monostearate, hydroxylated lecithin, lactylated fatty acid esters of glycerol and propylene glycol, polyglycerol esters of fatty acids, propylene glycol mono- and di-esters of fats and fatty acids, or emulsifiers that can become approved for the US FDA-defined soft candy category. In addition, other emulsifiers that can be used include polyglycerol polyricinoleate (PGPR), ammonium salts of phosphatidic acid, (e.g., YN) sucrose esters, oat extract, etc., any emulsifier found to be suitable in chocolate or similar fat/solid system or any blend.

5.4. Methods of Measuring Taste and Texture Attributes

In certain embodiments of the present application, the taste and texture attributes of a food product can be modified by admixing a flavor composition with the food product as described herein. In certain embodiments, the attribute(s) can be enhanced or reduced by increasing or decreasing the concentration of the flavor composition admixed with the food product. In certain embodiments, the taste or texture attributes of the modified food product can be evaluated as described herein, and the concentration of flavor composition admixed with the food product can be increased or decreased based on the results of the evaluation.

Taste and texture attributes can be reliably and reproducibly measured using sensory analysis methods known as descriptive analysis techniques. The Spectrum™ method of descriptive analysis is described in Morten Meilgaard, D.Sc. et al., Sensory Evaluation Techniques (3d ed. 1999). The Spectrum™ method is a custom design approach meaning that the highly trained panelists who generate the data also develop the terminology to measure the attributes of interest. Further, the method uses intensity scales created to capture the intensity differences being investigated. These intensity scales are anchored to a set of well-chosen references. Using these references helps make the data universally understandable and usable over time. This ability to reproduce the results at another time and with another panel makes the data potentially more valuable than analytical techniques which offer similar reproducibility but lack the ability to fully capture the integrated sensory experiences as perceived by humans.

When conducting quantitative descriptive analysis for compounds that modify other compounds, the testing methodology can be adapted to capture the change in character and intensity of the modified compound. For example, when testing for compounds that modify the crumb chocolate flavor attributes of other compounds, the panelists may first taste a crumb chocolate flavor attribute reference of agreed upon intensity in order to establish a reference point for comparison. After tasting the reference, panelists may taste and score the test sample for the attribute as well as any other basic taste, chemical feeling factor, or aromatic notes. To quantify any increase in perception of the attribute, the panelists may then re-taste the reference and again assign scores for attribute intensity as well as any other basic taste, chemical feeling factor, or aromatic notes. To quantify any lingering aftertaste, panelists may re-taste the attribute reference at 1 minute intervals until their perception of the attribute returns to the level of the reference. During the aftertaste evaluations, the panelists also note and score any other basic taste, chemical feeling factor, or aromatic notes.

6. EXAMPLES

The presently disclosed subject matter will be better understood by reference to the following Examples, which are provided as exemplary of the invention, and not by way of limitation.

Example 1: Identification of Major Odor-Active Compounds

The present example identified specific odor-active compounds of milk chocolate through AEDA and SHO techniques.

Preparation of the Aroma Isolates

The chocolate samples were deep-frozen with liquid nitrogen, ground into a fine powder with a laboratory mill, and sequentially extracted with diethyl ether (DEE) while stirring in the dark at room temperature for the times listed in the table below. After the sediment settled, the supernatant was decanted and new DEE was added to the sediment. Stirring commenced in the dark for the time indicated in the table below. In some instances, the decanting and continued extraction occurred more than once. The supernatants of each sample were combined for further evaluation.

TABLE 9

Extraction of Volatile Compounds Depending on Analytical Method

| Analytical Method | Amount | Extraction Procedure |
|---|---|---|
| AEDA | 50 g | 300 mL DEE for 2 h → 200 mL for 1 h |
| | | Identification experiments** |
| Direct analysis | 100 g | 300 mL DEE for 2 h → 200 mL for 1 h |
| | 200 g | 500 mL DEE for 2 h → 400 mL for 1 h → 300 mL for 1 h → 150 mL for 0.5 h |
| Column chromatography | 500 g | 450 mL DEE for 1.5 h → 200 mL for 1 h → 150 mL for 1 h (CGC) |

**By HRGC-MS, TD-HRGC-ITD-MS, GCxGC-TOF-MS

The volatile compounds were separated from non-volatile compounds by means of the high vacuum transfer (HVT) as a solvent assisted flavor evaporation (SAFE). The SAFE was carried out in a Baeng-apparatus according to Engel et al., *Eur Food Res Technol* 1999, 209, 237-241. The apparatus was heated to 40° C. in a water bath. A vacuum ($10^{-4}$-$10^{-5}$ mbar) was applied by means of a connected high vacuum pump (Leybold, Cologne). A 1 L round-bottomed flask was attached to the inlet and outlet legs of the apparatus, and an additional adapter was fixed beneath the inlet valve to impede a transfer of non-volatile compounds during the distillation. The safety cold trap and the outlet flask were cooled by fluid nitrogen to avoid a loss of volatiles.

The sample extract was slowly added via a dropping funnel into the inlet-flask, heated at 40° C. in a water bath. The volatile compounds evaporated and traveled through the warmed distillation unit into the outlet-flask cooled by fluid nitrogen, where the volatile compounds condensated and froze. The non-volatile compounds remained in the inlet flask.

After distillation, the equipment was ventilated and the flasks with the fractions were removed from the apparatus. The flask with the aroma distillate was thawed to allow further processing of the volatiles, either by filtering after drying over sodium sulfate and concentrating to the final total extract or for separation into fractions.

Separation into Acidic and Neutral-Basic Fractions

The thawed SAFE-distillate was extracted with an aqueous sodium carbonate solution (0.5 mol/L, 3×160 mL for 500 mL SAFE-distillate). The resulting organic phases were combined, washed with a saturated aqueous sodium chloride solution (2×50 mL), and dried over anhydrous sodium sulfate. After filtration through a paper filter, the remaining organic phase, containing the neutral-basic fraction, was concentrated to 200 μL at 40° C. by using a Vigreux column and a micro-distillation equipment according to Bemelmans Appl. Sci. Publ: London, 1979; Vol. 8. Auflage.

The residual aqueous phase of the carbonate extraction was acidified with hydrochloric acid (32%) to a pH-value of 2.5 and was extracted with diethyl ether (3×130 mL for 500 mL SAFE-distillate). The resulting and united organic phases were also washed with saturated aqueous sodium chloride solution (2×50 mL), dried over anhydrous sodium sulfate, and concentrated to 200 μL according to the neutral-basic fraction.

High Resolution Gas Chromatography-Olfactometry (HRGC-O)

The aroma extracts as well as the static headspace samples were analyzed by means of the HRGC-O. A Trace GC, CE Instruments, Thermo Quest HRGC system was used for HRGC-O analysis. In order to separate the odorants from other volatile compounds and detect the aroma quality at the same time, high resolution gas chromatography with detection by flame ionization detector (HRGC-FID) and by orthonasal perception via sniffing port (HRGC-O) was performed. DB-5 (30 m×0.32 mm, 0.25 μM F.D.) and DB-FFAP (30 m×0.25 mm, 0.25 μM F.D.) capillaries were used for the chromatographic separations. The samples were injected (1 μL injection volume) on-column at 40° C. using helium as the carrier gas. The effluent was split 1:1 by volume at the end of the capillary by a Y-type splitter (Chrompack, Frankfurt) into two sections of deactivated fused silica capillaries. One section was directed to the flame ionization detector (FID) held at 250° C., and the other part to a heated sniffing-port held at 230° C.

Temperature Programs:

$$\text{FFAP: } 40°\text{ C., 2 min} \xrightarrow{6°\text{ C./min}} 230°\text{ C., 10 min}$$

$$\text{DB-5: } 40°\text{ C., 2 min} \xrightarrow{6°\text{ C./min}} 240°\text{ C., 10 min}$$

The sniffing port is a heated block of aluminum with a hole, housing a deactivated capillary. The FID-chromatogram was recorded by a register (ABB Goerz/Metrawatt, Nurnberg with a sensitivity of 10 mV). During the HRGC-O analysis, the odor of the effluent from the sniffing-port was evaluated by a panelist, and as an odor was detected the retention time and the odor quality were recorded. By analyzing the extract sample orthonasally and visually by FID, low concentrations of high potent odorants were able to be detected.

Aroma Extract Dilution Analysis (AEDA)

SAFE isolates that have been separated into acidic and neutral-basic fractions were diluted to obtain serial dilutions of 1:1, 1:2, 1:4, 1:8, . . . 1:8192 of the stock aroma isolate solutions. The dilutions were tested from high to low and analyzed by HRGC-O with flame ionization detection (FID) and simultaneous orthonasal perception at the sniffing port until no odorant could be perceived any longer. The aroma-active regions were identified in the chromatograms, and each aroma detected was assigned a flavor-dilution factor (FD-factor) corresponding to the highest dilution in which the aroma was detectable. Thus, the higher the FD-factor (the lowest dilution at which an odorant can barely be perceived) the higher the importance of the odorant to the overall aroma/flavor.

Static Headspace Olfactometry (SHO)

15 g of milled chocolate material (DMGC or CGC) was filled into airtight headspace vials into which 20 mL of odorless sunflower oil was added. The samples were stirred in the dark at 40° C. for 90 min in a water bath to allow for the samples to equilibrate. The static headspace olfactometry was performed using a gas-tight syringe (Hamilton, Australia). The withdrawn volume of headspace was halved during each step (20 mL-157 μL) and was analyzed by HRGC-O until no aroma compound could be perceived at the sniffing port.

A Trace Ultra GC, Thermo Scientific, GC system was used for HRGC-O analysis. DB-5 (60 m×0.32 mm, 0.25 μM F.D.) capillary was used for the chromatographic separations. The headspace volume above the sample was withdrawn by a Combi PAL Autosampler (CTC Analytics, Zwingen, Switzerland) and was injected (157 μl-30 mL) cold-on-column at a GC-oven temperature of 0° C.

GC-Temperature Program for Identification and Dilution Analyses:

$$0°\text{ C., 2 min} \xrightarrow{6°\text{ C./min}} 150°\text{ C.} \xrightarrow{40°\text{ C./min}} 240°\text{ C., 2 min}$$

For quantitation experiments, adjustments of the temperature program depending on the analyzed odorant were performed.

The applied odorants were frozen on a deactivated fused silica column (0.53 mm I.D.) at −190° C. via a cold trap (Thermo Scientific, Germany). Afterwards, the cold trap was quickly heated to transfer the volatiles to the separation column which is coupled with a mass spectrometer and a sniffing-port.

For mass spectrometry, an electron impact ionization (EI) or chemical ionization (CI) was used with a mass range of 40-250 m/z. A time range of 1-21 minutes (depending on the analyte) was used for quantitation.

The FD-factor by the SHO is determined as follows:

$$FD-\text{factor} = \frac{V_h}{V_l}$$

$V_h$: initial, highest analyzed headspace volume $V_l$: lowest volume necessary to detect the odorant Results For identification of the most important aroma compounds for the overall sample-flavor, AEDA was performed. The different dilutions were analyzed by HRGC-O as described above until no odorant could be perceived and an FD-factor for each odorant in each sample was determined. The higher the FD-factor (the lowest dilution at which an odorant can barely be perceived), the higher the importance of the odorant to the overall aroma. When FD-factor ≥32, the odorant was deemed to be more important to overall aroma.

Identified odorants with a FD-factor of ≥32 in at least 2 of the 3 samples are listed in Table 10. The impact of the crumb process to the aroma of milk chocolate was examined by comparing the FD-factors of CGC with those of DMGC. A distinct difference between the samples was only recognized if the FD-factors between the samples differ in at least four dilution steps.

TABLE 10

Comparison of Identified Odorants and Corresponding FD-Factors in Extracts of DMGC and CGC

| | FD-factor | |
|---|---|---|
| Odorant | DMGC | CGC |
| pyrazines | | |
| 3-ethyl-2,5-dimethylpyrazine | 256 | 128 |
| 2-ethyl-3,5-dimethylpyrazine | 512 | 2048 |
| tetramethylpyrazine | 32 | <32 |
| 2,3-diethyl-5-methylpyrazine | 8192 | 4096 |
| 2-ethenyl-3,5-dimethylpyrazine[b)] | 32 | 128 |
| acids | | |
| acetic acid | 128 | 64 |
| butanoic acid | <32 | 512 |
| 2- and 3-methylbutanoic acid | 1024 | 4096 |
| hexanoic acid | 1024 | 128 |
| octanoic acid | 128 | 4096 |
| decanoic acid | 128 | 256 |
| phenylacetic acid | 2048 | 4096 |
| lactones | | |
| γ-decalactone | 256 | 256 |
| δ-decalactone | 1024 | 4096 |
| δ-dodecalactone | 32 | 32 |
| esters | | |
| ethyl phenyl acetate | 256 | 2048 |
| 2-phenylethyl acetate | 128 | 256 |
| aldehydes | | |
| (E)-2-nonenal | 64 | 256 |
| trans-4,5-epoxy-(E)-2-decenal | 256 | 8192 |
| 4-hydroxy-3-methoxybenzaldehyde | 1024 | 8192 |
| sulphurous compounds | | |
| dimethyl trisulfide | 32 | 64 |
| 2-methyl-3-(methyl dithio)-furan | 2048 | 256 |
| heterocyclic organic compounds | | |
| 3-hydroxy-2-methyl-pyran-4-one | 256 | 1024 |
| 4-hydroxy-2,5-dimethyl-3(2H)-furanone | 512 | 2048 |
| 3-hydroxy-4,5-dimethylfuran-2(5H)-one | 1024 | 256 |
| other | | |
| 1-octen-3-one | 256 | 2048 |
| 2-acetyl-1-pyrroline | 32 | 128 |

*odorants are sorted by substance class a) odorant detected by GCxGC-TOF-MS, but without an FD of >32

[b)]supposed odorant. This odor-active region was almost perceived in all three samples CGC exhibited higher FD-factors in its extract for 3-ethyl-2,5-dimethylpyrazine, 2,3-diethyl-5-methylpyrazine and the supposed 2-ethenyl-3,5-dimethylpyrazine.

With respect to acid compounds, definite differences were detected. CGC shows higher FD-factors for octanoic acid as compared to DMGC and a higher FD-factor for butanoic acid than DMGC. DMGC, however, exhibited an unambiguous higher FD-factor for hexanoic acid as compared to CGC.

Differences were also detected for lactones and esters. CGC had a much higher FD-factor for ethyl phenyl acetate as compared to DMGC. The same trend was present for trans-4,5-epoxy-(E)-2-decenal, 4-hydroxy-3-methoxybenzaldehyde and 1-octen-3-one, in which CGC has the higher FD-factor as compared to DMGC. By contrast, DMGC exhibited a distinctly higher FD-factor for 2-methy-3-(methyl dithio)-furan as compared to CGC.

An aroma extract dilution analysis via static headspace olfactometry (SHO) was performed to differentiate between the most potent and less or non-aroma active highly volatile compounds of the samples. The odorants were identified by comparison with reference solutions on the basis of retention indices, odor qualities, and intensities smelled at the sniffing port and by mass spectrometry with different ionization methods (EI and CI). The results are in Table 11.

TABLE 11

Highly Volatiles in CGC and DMGC and Corresponding FD-Factors

| no. | aroma compound | RI (DB-5) | FD-Factor CGC | FD-Factor DMGC |
|---|---|---|---|---|
| 1 | 3-hydroxy-2-butanone | <<555 | 8 | 8 |
| 2 | methanethiol | <555 | 2 | 8 |
| 3 | methylpropanal | 555 | 8 | 8 |
| 4 | 2,3-butanedione | 593 | 4 | 8 |
| 5 | ethyl acetate | 633 | — | — |
| 6 | 3-methylbutanal | 652 | 8 | 8 |
| 7 | 2-methylbutanal | 657 | — | 1 |

Besides the malty smelling strecker aldehydes (methypropanal and 2- and 3-methylbutanal), 3-hydroxy-2-butanone and 2,3-butanedione were identified. Additionally, one *sulphurous* compound, methanethiol, was detected. The solvent-like ethyl acetate was also detected by mass spectrometry, however this compound was not odor-active at the sniffing port. As such, while ethyl acetate is a volatile component of these samples, it was not important for the aroma as it was not orthonasally perceivable during the SHO.

There were no distinct/significant differences in the FD-factors of CGC as compared to DMGC. Thus, no major differences in the dilution analyses of the highly volatiles exist.

While both chocolates (CGC and DMGC) were produced from the same raw materials and ingredients, but differed in the manufacturing process, the crumb process increased the amount of several odorants, but at the same time decreased the amount of some aroma compounds. Generally, the CGC extracts exhibited a higher FD-factor than the DMGC extracts. As such, the crumb process influenced the amount of odorants in the resulting chocolate, and the ingredients added to the crumb powder to produce crumb chocolate further increased the amount of odorants.

Example 2: Quantitation of Odorants

The highly volatile compounds methylpropanal, 2- and 3-methylbutanal, 2,3-butanedione and methanethiol were quantitated in the headspace of the sample by means of the stable isotope dilution analysis and static headspace gas chromatography—mass spectrometry (see Example 1). Deuterated and $^{13}C$-labeled internal standards we used as well as the corresponding retention indices. The data is summarized in Table 12.

TABLE 12

Determined Concentrations of Highly Volatile Compounds in DMGC and CGC

| | DMGC $\bar{x}$ + s[a)] | DMGC n[b)] | CGC $\bar{x}$ + s[a)] | CGC n[b)] |
|---|---|---|---|---|
| methanethiol | 0.76 ± 0.08 | 3 | 1.21 | 2 |
| 2,3-butanedione | 22.9 | 2 | 29.9 ± 2.96 | 3 |
| methylpropanal | 78.5 | 2 | 214 ± 7.32 | 3 |
| 2-methylbutanal | 48.8 | 2 | 168 ± 8.29 | 3 |
| 3-methylbutanal | 525 | 2 | 385 ± 47.6 | 3 |

[a)]average concentration and standard deviation in μg/kg

[b)]number of recurrences of the analyzed sample

CGC had the higher concentration of three out of the five highly volatile compounds tested. CGC had almost twice as much of methanethiol, almost three times as must of methylpropanal, and almost four times as much of 2-methylbutanal as compared to DMGC. As for the other two highly volatile compounds—CGC and DMGC had comparable levels of 2,3-butanedione, while 3-methylbutanal was highest for DMGC.

In comparing the pure quantitative data of CGC, distinct differences in the concentration of 2,3-butanedione and the Strecker aldehydes could be determined, except for methanethiol, in which almost comparable amounts were quantitated.

Such quantitative data are partially comparable to literature data of Schmitt for crumb chocolate (on the role of ingredients as sources of key aroma compounds in crumb chocolate. TU München, Garching, 2005) and Pfnür for dry mix chocolate (Untersuchungen zum Aroma von Schokolade. TU München, Garching, 1998.). With respect to crumb chocolate, while there were some differences (some higher and some lower), the differences were not large and most likely attributable to the recipe or manufacturing processes. As for dry mix chocolate, many of the odorants were lower than the literature reported values. See, Pfnür. These differences too may be due to the recipe and/or manufacturing processes.

The quantitative results disagree with the results of SHO (Example 1) where no distinct differences between the FD-factors were observed. It is noted that dilution analysis is primarily a screening method, and depending on the amount of the sample, matrix effects on volatile release, and on the physical condition of the panelist the quantitative results may be more meaningful. A definite statement about the influence of a single odorant on the overall aroma and, hence, on the difference of the aroma and the creaminess of the chocolates was only possible by the odor activity value (OAV) in Example 3.

Additional analysis was conducted to examine additional odorants. Deuterated and $^{13}C$-labeled internal standards we used as well as the corresponding retention indices. Depending on the internal standard GCxGC-TOF-MS in the EI-mode or HRGC-GC-MS measurements in the CI-mode were performed. The results are presented in Table 13.

TABLE 13

| Quantitation of Selected Odorants in DMGC, CGC | | | | |
|---|---|---|---|---|
| | DMGC | | CGC | |
| | x̄ + s[a] | n[b] | x̄ + s[a] | n[b] |
| acetic acid | 15281 ± 914 | 3 | 11607 | 2 |
| butanoic acid | 704 ± 23.2 | 3 | 504 ± 4.61 | 3 |
| 2-methylbutanoic acid | 260 ± 7.19 | 3 | 135 | 2 |
| 3-methylbutanoic acid | 533 | 3 | 312 | 2 |
| hexanoic acid | 700 ± 54.5 | 5 | 731 ± 32.2 | 5 |
| octanoic acid | 198 ± 25.0 | 5 | 185 ± 21.4 | 4 |
| nonanoic acid | 355 ± 20.3 | 3 | 279 ± 36.6 | 4 |
| phenylacetic acid | 515 ± 52.2 | 3 | 396 ± 26.1 | 3 |
| 2,3-diethyl-5-methylpyrazine | 2.82 ± 0.18 | 4 | 2.87 ± 0.15 | 6 |
| 2-ethyl-3,5-dimethylpyrazine | 11.6 ± 0.74 | 3 | 8.24 ± 0.62 | 3 |
| 3-ethyl-2,5-dimethylpyrazine | 12.5 ± 1.16 | 3 | 6.52 ± 0.09 | 3 |
| trimethylpyrazine | 33 ± 4.47 | 4 | 14.8 ± 0.92 | 4 |
| tetramethylpyrazine | 109 ± 3.05 | 4 | 35.1 ± 1.55 | 6 |
| γ-octalactone | 7.81 ± 0.29 | 3 | 5.57 | 2 |
| δ-octalactone | 88.8 ± 2.77 | 3 | 92.8 | 2 |
| γ-nonalactone | 30.8 ± 1.29 | 3 | 53.1 ± 1.59 | 3 |
| δ-decalactone | 387 ± 18.8 | 3 | 430 ± 5.25 | 3 |
| δ-decenolactone | 59.2 ± 4.11 | 3 | 39.3 ± 3.70 | 3 |
| γ-undecalactone | 20.4 | 2 | 21.7 ± 0.95 | 3 |
| γ-dodecalactone | 1401 | 2 | 1218 | 2 |
| δ-dodecalactone | 2122 | 2 | 2536 | 2 |
| ethyl phenyl acetate | 10.1 ± 0.24 | 3 | 3.57 ± 0.09 | 3 |
| dimethyl trisulfide | 2.44 ± 0.05 | 3 | 3.23 | 2 |
| (E)-2-nonenal | 12.1 ± 0.13 | 3 | 10.0 | 2 |
| phenylacetaldehyde | 6.52 ± 0.23 | 3 | 10.1 ± 0.58 | 3 |
| 4-hydroxy-3-methoxybenzaldehyde | 188 ± 2.22 | 3 | 167 ± 2.39 | 3 |
| 1-octen-3-one | 1.54 ± 0.07 | 3 | 1.99 ± 0.18 | 3 |
| 4-hydroxy-2,5-dimethyl-3(2H)-furanone | 72.7 ± 3.8 | 3 | 183 ± 13.8 | 3 |
| 3-hydroxy-2-methyl-4H-pyran-4-one | 156 | 2 | 158 | 2 |
| indole | 42.2 ± 5.07 | 2 | 49.2 ± 2.18 | 3 |
| 3-methylindole | 2.59 ± 0.03 | 3 | 2.22 ± 0.02 | 3 |

[a]average concentration and standard deviation in μg/kg
[b]number of recurrences of the analyzed sample In comparing odorants in CGC than in DMGC, three compounds stood out: methanethiol, phenylacetaldehyde, and 4-hydroxy-2.5-dimethyl-3(2H)-furanone. The difference in the compound concentrations between both chocolates was attributed to the crumb powder and, hence, the crumb process, as the content was the same for both chocolates.

Example 3: Odor Activity

The odor activity value (OAV) is a measure of importance of a specific compound to the overall odor of a sample (e.g., chocolate). It is calculated as the ratio between the concentration of individual substance in a sample and the threshold concentration of this substance (odor threshold value, the minimal concentration that can be detected by human nose) or:

$$OAV = \frac{\text{concentration(odorant)}}{\text{threshold (odorant)}}$$

As such, odorants with an OAV greater than one generally contribute to the aroma of the corresponding food.

The odor threshold was determined in a model aroma matrix. As crumb chocolate consists of about 30% fat the odor thresholds were performed in odorless sunflower oil according to Czerny et al. *European food research and technology* 1993, 196 (5), 417-422. Literature based odor thresholds were only used if they were performed under the same conditions. Based on the determined odor thresholds and the quantitation experiments the odor activity value of the analyzed odorants were calculated and presented in Table 14.

TABLE 14

| Odor Activity Value of Quantitated Odorants in DMGC and CGC | | |
|---|---|---|
| Odorant | DMGC | CGC |
| dimethyl trisulfide | 81 | 108 |
| butanoic acid | 89 | 64 |
| 2,3-butanedione | 25 | 33 |
| acetic acid | 40 | 30 |
| 3-methylbutanoic acid | 47 | 28 |
| 3-methylbutanal | 36 | 26 |
| phenylacetic acid | 20 | 15 |
| methylpropanal | 5 | 14 |
| 4-hydroxy-2,5-dimethyl-3(2H)-furanone | 3 | 7 |
| 2-methylbutanal | 1 | 5 |
| tetramethylpyrazine | 12 | 4 |
| 2-ethyl-3,5-dimethylpyrazine[a] | 5 | 4 |
| methanethiol | 2 | 3 |
| hexanoic acid | 2 | 2 |
| nonanoic acid | 2 | 2 |
| 4-hydroxy-3-methoxybenzaldehyde | 1 | 1 |
| 2-methylbutanoic acid | 2 | 1 |
| γ-octalactone | <1 | <1 |
| (E)-2-nonenal | <1 | <1 |
| δ-octalactone | <1 | <1 |
| γ-nonalactone | <1 | <1 |
| γ-undecalactone | <1 | <1 |
| ethyl phenyl acetate | <1 | <1 |
| 3-hydroxy-2-methyl-4H-pyran-4-one | <1 | <1 |
| phenylacetaldehyde | <1 | <1 |
| octanoic acid | <1 | <1 |
| 1-octen-3-one | <1 | <1 |
| γ-dodecalactone | <1 | <1 |
| δ-dodecalactone | <1 | <1 |
| 2,3-diethyl-5-methylpyrazine | <1 | <1 |
| trimethylpyrazine | <1 | <1 |
| indole | <1 | <1 |
| 3-methylindole | <1 | <1 |
| 3-ethyl-2,5-dimethylpyrazine[a] | <1 | <1 |
| δ-decalactone | <1 | <1 |
| δ-decenolactone[a] | <1 | <1 |

[a]determination of the odor activity value by use of the recognition threshold of the literature
(Schmitt) Remaining OAV's are calculated by use of the absolute threshold of the panel As mentioned above, only odorants with an OAV greater than one tend to contribute to the aroma of the food. Furthermore, distinct differences between OAVs are generally evident only if an OAV in one sample was at least twice as much as in another.

Only five odorants differed significantly between CGC and DMGC: 2-methylbutanal, methylpropanal, 4-hydroxy-2,5-dimethyl-3(2H)-furanone, tetramethylpyrazine and 2-methylbutanoic acid. Based on these results, the differences in the caramel-like and earthy odor qualities in the aroma profile were confirmed, and these five odororants were found to contribute to the difference between the aroma of crumb chocolate and dry mix chocolate.

Example 4: Aroma Simulation and Omission Experiments

An odorless matrix was constructed to evaluate which odorants contribute to crumb chocolate's aroma. The matrix was chocolate, and dry mix chocolate was used to create the matrix for the recombinants of DMGC and CGC. 50 g of DMGC was extracted with 200 mL diethyl ether for 1 h. After decanting and evaporating the solvent by means of vacuum rotary evaporation, 100 mL of water was added. The mixture was stirred for 30 min at 37° C. and then transferred to the solvent assisted flavor evaporation. Subsequently the resulting distillate was extracted with 200 mL diethyl ether for 1 h to remove the odorants generated from the precursors during the addition of water. After separating the solvent by decanting, the powder was extracted within a polarity gradient from unpolar to polar, 100 mL solvent for 30 min each. The solvent was decanted after each extraction step. Finally the ethanol was separated by means of the vacuum rotary evaporation at 40° C. and 100 mbar and the resulting powder was dried in the drying cabinet for 2½ h.

Stock solutions of thirty-five odorants listed in Tables 15 and 16 of Example 2 that were identified in dry mix and crumb chocolate were prepared in ethanol at 1000 times higher concentrations than found in the respective dry mix chocolate and crumb chocolate samples. δ-decenolactone was not evaluated as no pure substance in a sufficient quantity was available. Methanethiol was added as Na-methanethiolate, and as such amount added of Na-methanethiolate was adjusted to be equivalent to methanethiol.

20 μL of each mix was added to 20 g odorless chocolate matrix and stirred for 1½ h to create a recombinant dry mix chocolate, recombinant crumb chocolate and recombinant crumb powder samples.

2.5 g of the recombinant mixes were orthonasally compared with the original chocolate (2.5 g) by means of a comparative aroma profile analysis. The same descriptors as used in Example 1 were also used and the aroma intensities of the chocolates' were used as reference values for these analyses (i.e., a range of 0-3; 0: not detectable, 1: weakly detectable, 2: unequivocally detectable, 3: strongly detectable). Furthermore the similarity of the recombinant and the original chocolate was also evaluated, with 1=weak similarity, 2=food identified, 3=identical. 0.1 intermediates were also allowed.

Aroma simulation of crumb chocolate CGC After equilibration, the intensities of the given odor qualities were evaluated by means of an orthonasal aroma profile analysis comparing the overall aroma of the crumb chocolate recombinant with the overall odor of the original crumb chocolate. As demonstrated in FIG. 2, the overall aroma of the original chocolate was simulated quite well by its recombinant. Only slight differences were evident for the creamy, malty and coconut-like odor qualities. Furthermore, when the panel was asked to evaluate the similarity of the recombinant and the chocolate, the recombinant received a value of 2.6, which demonstrates a very high similarity to the aroma of the original chocolate. As such, the quantitative data were valid and at least the decisive odorants for the overall aroma and creaminess were both identified and quantitated for crumb chocolate.

Aroma Simulation of Dry Mix Chocolate DMGC

After equilibration, the intensities of the given odor qualities were evaluated by means of an orthonasal aroma profile analysis comparing the overall aroma of the dry mix chocolate recombinant with the overall odor of the original dry mix chocolate. As demonstrated in FIG. 3, there was a very good match of the overall aroma between the dry mix chocolate and its recombinant. Only slight differences for the creamy, malty, roasty and coconut-like odor qualities were detected. Moreover, the panelists rated the similarity as a 2.6. Consequently, as for CGC, the quantitative data were deemed valid and hence at least all necessary odorants for the overall aroma and creaminess of dry mix chocolate were identified and quantitated.

Example 5: Omission Experiments

Based on the recombinant results, omission experiments with the crumb chocolate and dry mix chocolate aroma mixtures were performed. The recombinants of Example 4 were compared to new recombinants that were missing specific odorants. Therefore, the whole recombinants of CGC and DMGC respectively, consisting of 35 quantitated odorants each, were orthonasally compared with associated mixtures in which certain odorants were missing (see Tables 18 and 19). By triangle tests under forced-choice conditions the panelists were asked to identify the differing sample and to evaluate the creaminess of the divergent sample in comparison to the other ones.

A triangle test is described, for example, by the DIN ISO 4120/§ 64 LFGB, method 00.90-7, wherein the method comprises a series of triads, wherein each triad (i.e., set of three vessels) comprised two vessels with identical samples and a third vessel with a different sample. Trained panelists determine the deviating sample in each triad via orthonasal perception. If no difference was observed, the panelist was requested to speculate which one was different (forced-choice).

A significant influence on the overall aroma and/or creaminess indicates that an odorant or a group of odorants contributes to the overall aroma and/or is decisive for the creaminess.

TABLE 15

Results of Omission Experiments Performed with the CGC Recombinant

| Experiment | Omitted Odorants | Significant Influence on Overall Aroma | Significant Influence on Creaminess |
|---|---|---|---|
| | Highly volatiles | | |
| 1 | 2,3-butanedione<br>methanethiol<br>2-methylbutanal<br>3-methylbutanal<br>methylpropanal | yes ($\alpha$ = 0.001) | yes ($\alpha$ = 0.05) |
| 2 | methanethiol | yes ($\alpha$ = 0.05) | yes ($\alpha$ = 0.05) |
| 3 | 2,3-butanedione | yes ($\alpha$ = 0.05) | no |
| 4 | 2-methylbutanal<br>3-methylbutanal | no | no |
| 5 | methylpropanal | yes ($\alpha$ = 0.05) | no |

TABLE 15-continued

Results of Omission Experiments Performed with the CGC Recombinant

| Experiment | Omitted Odorants | Significant Influence on Overall Aroma | Significant Influence on Creaminess |
|---|---|---|---|
| | Lactones | | |
| 6 | All Quantitated Lactones | yes (α = 0.05) | yes (α = 0.001) |
| | Quantitated Odorants | | |
| 7 | All Quantitated Odorants with OAV <1, except for the lactones | yes (α = 0.05) | no |
| | Caramelic Products | | |
| 8 | 4-hydroxy-2,5-dimethyl-3(2H)-furanone | no | no |
| 9 | 4-hydroxy-2,5-dimethyl-3(2H)-furanone phenylacetaldehyde 3-hydroxy-2-methyl-4H-pyran-4-one (maltol) | yes (α = 0.001) | yes (α = 0.01) |

The highly volatiles were investigated because there were distinct differences in the OAV of these odorants in CGC and DMGC. Crumb powder was the main source of methanethiol in the final CGC. It was evident that all highly volatiles together were important for the overall aroma of CGC; however, only methanethiol contributed significantly to CGC's creaminess.

Based on literature that showed that lactones were important for the creaminess of cream in other products (Schlutt, B. et al., *Agric. Food Chem.* 2007, 55, 9634-9645), all quantitated lactones were investigated, except for δ-decenolactone, in which not enough material was available. The lactones significantly influenced the overall aroma and creaminess even though they had OAVs below 1. Such results were not only additive but synergistic. When all odorants with an OAV less than 1 was omitted (except for the lactones), there was an effect on the overall aroma, but creaminess was not influenced.

4-hydroxy-2,5-dimethyl-3(2H)-furanone alone showed no significant influence, but in combination with phenylacetaldehyde and 3-hydroxy-2-methyl-4H-pyran-4-one (i.e., maltol) there was a significant contribution to the overall aroma and creaminess. Interestingly, although phenylacetaldehyde and 3-hydroxy-2-methyl-4H-pyran-4-one had OAVs below 1, they appeared to influence the effect of 4-hydroxy-2,5-dimethyl-3(2H)-furanone on the overall odor and creaminess of CGC. These odorants were chosen due to similar odor qualities (honey-like, caramel-like), and the fact that 4-hydroxy-2,5-dimethyl-3(2H)-furanone was in higher concentrations in CGC than DMGC indicates the source of many of these compounds appeared to come from crumb powder.

TABLE 16

Results of Omission Experiments Performed with the DMGC Recombinant

| Experiment | Omitted Odorants | Significant Influence on Overall Aroma | Significant Influence on Creaminess |
|---|---|---|---|
| 10 | 2-methylbutanoic acid | no | no |
| 11 | tetramethylpyrazine | yes (α = 0.05) | no |

In Table 16 above, odorants with a distinct higher concentration and OAV in DMGC than CGC were omitted. Only tetramethylpyrazine significantly influenced the overall aroma but the creaminess of the DMGC recombinant was not increased by omitting this odorant. As no other odorant could confirm the second hypothesis, the fact that DMGC is less creamy must result from lower concentrations of odorants in DMGC as compared to CGC. Hence, the higher creaminess of CGC must be based on higher concentrations of aroma compounds in this crumb chocolate.

Example 6: Spiking Experiment

Odorants identified as important for aroma and creaminess, based on the omission experiments, were added to DMGC to achieve the concentrations found in CGC (see Table 17). 20 gm of melted DMGC and 20 gm of melted CGC (each melted and cooled) were orthonasally compared with 20 gm of spiked DMGC (DMGC*) in a pair-by-pair-comparison. The panel was asked to determine the creamier sample using forced-choice conditions. The experiments were evaluated based on DIN 10954, October 1997. The spiked DMGC was evaluated highly significantly creamier than the unspiked DMGC (α=0.001). However, it was not possible to detect a difference in the creaminess of unspiked CGC and spiked DMGC.

TABLE 17

Amounts Determined and Added for Spiked Experiments

| Odorant | Difference Between Crumb and Dry-Mix (μg/kg) | Amount Added to Spiked Dry-Mix Sample (μg/kg) | Total Amounts Found in Spiked Sample (μg/kg) | Amounts Found in Crumb Chocolate Sample (μg/kg) |
|---|---|---|---|---|
| dimethylhydroxy furanone (furaneol) | 110 | 110 | 182.7 | 182.7 |
| phenylacetaldehyde | 3.58 | 3.58 | 10.1 | 10.1 |
| maltol | 2 | 2 | 158 | 158 |
| methanethiol | 0.45 | 0.45 | 1.21 | 1.21 |
| δ-decalactone | 42.43 | 42.48 | 429.63 | 429.58 |
| δ-dodecalactone | 413.73 | 407.62 | 2530.03 | 2536.14 |
| δ-octalactone | 4 | 4 | 92.8 | 92.8 |
| γ-nonalactone | 22.3 | 22.99 | 53.07 | 53.1 |
| γ-undecalactone | 1.34 | 1.34 | 21.74 | 21.74 |

Based on the omission experiments several odorants significantly influenced the creaminess of CGC. See Table 18. However, not all of these odorants had higher concentrations in CGC than in DMGC, only the odorants which are indicated in Table 18.

TABLE 18

| Results of the Omission Experiments: Odorants Which Influence the Creaminess of CGC | | |
|---|---|---|
| 4-hydroxy-2,5-dimethyl-3(2H)-furanone | methanethiol | δ-decalactone |
| phenylacetaldehyde | | δ-dodecalactone |
| 3-hydroxy-2-methyl-4H-pyran-4-one | | δ-octalactone |
| | | γ-nonalactone |
| | | γ-undecalactone |

Consequently, the creaminess of DMGC could be adapted to CGC's creaminess by increasing the concentration of following odorants: 4-hydroxy-2,5-dimethyl-3(2H)-furanone, phenylacetaldehyde, 3-hydroxy-2-methyl-4H-pyran-4-one, methanethiol, δ-octalactone, γ-nonalactone, δ-decalactone, γ-undecalactone and δ-dodecalactone.

DISCUSSION

No significant qualitative differences were detected between the most potent odorants in both the crumb chocolate and dry mix chocolate were detected (see Example 1). However, there were distinct differences in the FD-factor of some aroma compounds between the chocolates were noticeable, as for some acids, trans-4,5-epoxy-(E)-2-decenal, 2-methyl-3-(methyl dithio)-furan and 1-octen-3-one.

With respect to the odor activity value (OAV), the differences between the chocolates were drastically minimized. In both cases, only 17 of the 36 quantitated odorants had an OAV greater than one. All investigated lactones and several pyrazines had OAVs below one. Dimethyl trisulfide showed the highest OAV in CGC (108), whereas butanoic acid was the most potent odorant in DMGC (OAV: 89). Only five aroma compounds differed distinctly between the chocolates. DMGC showed higher OAVs for 2-methylbutanoic acid and tetramethylpyrazine, CGC for 2-methylbutanal, methylpropanal and 4-hydroxy-2,5-dimethyl-3(2H)-furanone.

While only odorants with an OAV greater than 1 were expected to contribute to the aroma of a sample, omission experiments showed that aroma compounds with concentrations below their odor threshold significantly influenced the overall odor. For example, 4-hydroxy-2,5-dimethyl-3(2H)-furanone contributed to the aroma as it has an OAV above 1. 4-hydroxy-2,5-dimethyl-3(2H)-furanone, however, only affected the aroma and creaminess in combination with phenylacetaldehyde and 3-hydroxy-2-methyl-4H-pyran-4-one, which were both present in concentrations below their odor thresholds. Likewise, all lactones together significantly influenced the overall aroma and creaminess, but they each had an OAV value below 1. As such, significant effect on overall aroma and creaminess despite the concentrations being below the threshold, are not only additive but exhibit synergism as well.

Example 7: Crumb Chocolate Flavor Composition to Dry Mix Chocolate

The present example provides a non-limiting example of a composition for a crumb chocolate flavor composition. This crumb chocolate flavor composition can be used, for an example, but not limited to, impart a crumb chocolate flavor to a dry mix chocolate.

TABLE 19

A Composition for a Crumb Chocolate Flavor

| Odorant | μg/kg of the Admixture | w/w % of the Flavor Composition |
|---|---|---|
| dimethylhydroxy furanone (furaneol) | 110 | 18.5 |
| phenylacetaldehyde | 3.6 | 0.6 |
| maltol | 2 | 0.3 |
| methanethiol | 0.45 | 0.08 |
| δ-decalactone | 42 | 7.1 |
| δ-dodecalactone | 408 | 69 |
| δ-octalactone | 4 | 0.7 |
| γ-nonalactone | 23 | 3.9 |
| γ-undecalactone | 1.3 | 0.2 |
| Total | 594.35 | 100 |

Example 8: Crumb Chocolate Flavor Composition to End Product

The present example provides a non-limiting example of a composition for a crumb chocolate flavor composition. This crumb chocolate flavor composition can be used, for an example, to impart the aroma and creaminess of crumb chocolate to an end product.

TABLE 20

A Composition for a Crumb Chocolate Flavor

| Odorant | μg/kg of the Admixture | w/w % of the Flavor Composition |
|---|---|---|
| dimethylhydroxy furanone (furaneol) | 183 | 5.2 |
| phenylacetaldehyde | 10.1 | 0.3 |
| maltol | 158 | 4.5 |
| methanethiol | 1.2 | 0.03 |
| δ-decalactone | 430 | 12.3 |
| δ-dodecalactone | 2536 | 73 |
| δ-octalactone | 93 | 2.7 |
| γ-nonalactone | 53 | 1.5 |
| γ-undecalactone | 21.7 | 0.6 |
| Total | 3486 | 100 |

Example 9: Crumb Chocolate Flavor Composition to Food Product

The present example provides a non-limiting example of a composition for a crumb chocolate flavor composition. This crumb chocolate flavor composition contains the odorants in crumb chocolate, and can be admixed to a food product to impart the aroma and creaminess of crumb chocolate to the food product.

TABLE 21

A Composition for a Crumb Chocolate Flavor

| Odorant | μg/kg of the Admixture | w/w % of the Flavor Composition |
|---|---|---|
| methanethiol | 1.2 | 0.01 |
| 2,3-diethyl-5-methylpyrazine | 2.9 | 0.01 |
| dimethyl trisulfide | 3.2 | 0.02 |
| ethyl phenyl acetate | 3.6 | 0.02 |
| γ-octalactone | 5.6 | 0.03 |
| 3-ethyl-2,5-dimethylpyrazine b) | 6.5 | 0.03 |
| 2-ethyl-3,5-dimethylpyrazine b) | 8.2 | 0.04 |

TABLE 21-continued

A Composition for a Crumb Chocolate Flavor

| Odorant | μg/kg of the Admixture | w/w % of the Flavor Composition |
|---|---|---|
| (E)-2-nonenal | 10 | 0.05 |
| trimethylpyrazine | 14.8 | 0.07 |
| γ-undecalactone | 21.7 | 0.11 |
| 2,3-butanedione | 30 | 0.15 |
| tetramethylpyrazine | 35 | 0.18 |
| γ-nonalactone | 53 | 0.27 |
| δ-octalactone | 93 | 0.47 |
| 2-methylbutanoic acid | 135 | 0.68 |
| vanillin | 167 | 0.84 |
| 2-methylbutanal | 168 | 0.84 |
| dimethylhydroxy furanone (furaneol) | 183 | 0.92 |
| octanoic acid | 190 | 0.95 |
| methylpropanal | 214 | 1.1 |
| nonanoic acid | 279 | 1.4 |
| 3-methylbutanoic acid | 312 | 1.6 |
| 3-methylbutanal | 385 | 1.9 |
| phenylacetic acid | 396 | 2.0 |
| δ-decalactone | 430 | 2.2 |
| butanoic acid | 504 | 2.5 |
| hexanoic acid | 731 | 3.7 |
| γ-dodecalactone | 1218 | 6.1 |
| δ-dodecalactone | 2536 | 12.7 |
| acetic acid | 11607 | 58 |
| phenylacetaldehyde | 10.1 | 0.05 |
| maltol | 158 | 0.79 |
| 1-octen-3-one | 2.0 | 0.01 |
| 3-methylindol | 2.2 | 0.01 |
| indol | 49 | 0.25 |
| Total | 19965 | 100 |

Although the presently disclosed subject matter and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein can be utilized according to the presently disclosed subject matter. Accordingly, the appended claims are intended to include within their scope such processes, machines, manufacture, compositions of matter, means, methods, or steps.

What is claimed is:

1. A chocolate composition comprising dry milk chocolate and an extraneous flavor composition, wherein the extraneous flavor composition consists of a) a highly volatile compound, b) at least one lactone compound selected from the group consisting of δ-dodecalactone, δ-decalactone, γ-nonalactone, δ-octalactone, γ-undecalactone, and combinations thereof, and c) a mixture of dimethylhydroxy furanone, phenylacetaldehyde, and maltol, wherein dimethylhydroxy furanone is present in an amount of from 0.1% to about 20% w/w of the flavor composition, wherein phenylacetaldehyde is present in an amount of from about 0.005% to about 1% w/w of the flavor composition and wherein maltol is present in an amount of from about 0.1% to about 5% w/w of the flavor composition.

2. The chocolate composition of claim 1, wherein the chocolate composition comprises an additional lactone compound selected from the group consisting of δ-valerolactone, γ-valerolactone, δ-hexalactone, γ-hexalactone, δ-heptalactone, γ-heptalactone, γ-octalactone, δ-octenolactone, δ-nonalactone, γ-decalactone, δ-decenolactone (massoia lactone), δ-undecalactone, γ-dodecalactone, 5-butyldihydro-4-methylfuran-2(3H)-one (whiskey lactone), 6-pentylpyran-2-one, and combinations thereof.

3. The chocolate composition of claim 1, wherein the highly volatile compound is selected from the group consisting of methanethiol, 2,3-butanedione, 2-methylbutanal, 3-methylbutanal, methylpropanal, and combinations thereof.

4. The chocolate composition of claim 3, wherein the highly volatile compound is methanethiol.

5. The chocolate composition of claim 1, wherein the extraneous flavor composition is admixed at a concentration from about 500 μg/kg to about 5000 μg/kg of the chocolate composition.

6. The chocolate composition of claim 5, wherein the extraneous flavor composition is admixed at a concentration from about 3000 μg/kg to about 4000 μg/kg of the chocolate composition.

7. The chocolate composition of claim 1, wherein the extraneous flavor composition is admixed at a concentration from about 0.00005% to about 20% w/w of the chocolate composition.

8. The chocolate composition of claim 7, wherein the extraneous flavor composition is admixed at a concentration from about 0.0001% to about 17% w/w of the chocolate composition.

9. The chocolate composition of claim 1, wherein the highly volatile compound is present in an amount of from about 0.001% to about 25% w/w of the extraneous flavor composition.

10. The chocolate composition of claim 1, wherein the lactone compound is present in an amount of from about 0.01% to about 98% w/w of the extraneous flavor composition.

11. The chocolate composition of claim 1, wherein the lactone compound comprises (i) δ-dodecalactone in an amount of from about 5% to about 80% w/w of the extraneous flavor composition;

(ii) δ-decalactone in an amount of from about 0.5% to about 15% w/w of the extraneous flavor composition;

(iii) γ-nonalactone in an amount of from about 0.05% to about 5% w/w of the extraneous flavor composition;

(iv) δ-octalactone in an amount of from about 0.1% to about 3% w/w of the extraneous flavor composition; and (v) γ-undecalactone in an amount of from about 0.01% to about 1% w/w of the extraneous flavor composition.

12. The chocolate composition of claim 4, wherein the highly volatile compound is methanethiol in an amount of from about 0.001% to about 0.1% w/w of the extraneous flavor composition.

13. The chocolate composition of claim 2, wherein the lactone compound provides an odor activity value less than 1.

14. A flavor composition consisting of a) a highly volatile compound, b) a lactone compound selected from the group consisting of δ-dodecalactone, δ-decalactone, γ-nonalactone, δ-octalactone, γ-undecalactone, and combinations thereof, and c) a mixture comprising dimethylhydroxy furanone, phenylacetaldehyde, and maltol, wherein the highly volatile compound is present in an amount of from about 0.001% to about 25% w/w of the flavor composition, the lactone compound is present in an amount of from about 0.01% to about 98% w/w of the flavor composition, and wherein the mixture is present in an amount of from about 0.005% to about 25% w/w of the flavor composition.

15. The flavor composition of claim 14, wherein the highly volatile compound is selected from the group consisting of methanethiol, 2,3-butanedione, 2-methylbutanal, 3-methylbutanal, methylpropanal, and combinations thereof.

16. The flavor composition of claim 15, wherein the highly volatile compound is methanethiol.

17. The flavor composition of claim 14, wherein the mixture comprises (i) dimethylhydroxy furanone in an amount of from about 0.1% to about 20% w/w of the flavor composition;

(ii) phenylacetaldehyde in an amount of from about 0.005% to about 1% w/w of the flavor composition; and (iii) maltol in an amount of from about 0.1% to about 5% w/w of the flavor composition.

18. The flavor composition of claim 14, wherein the lactone compound comprises (i) δ-dodecalactone in an amount of from about 5% to about 80% w/w of the flavor composition;

(ii) δ-decalactone in an amount of from about 0.5% to about 15% w/w of the flavor composition;

(iii) γ-nonalactone in an amount of from about 0.05% to about 5% w/w of the flavor composition;

(iv) δ-octalactone in an amount of from about 0.1% to about 3% w/w of the flavor composition; and (v) γ-undecalactone in an amount of from about 0.01% to about 1% w/w of the flavor composition.

19. The flavor composition of claim 16, wherein the highly volatile compound is methanethiol in an amount of from about 0.001% to about 0.1% w/w of the flavor composition.

20. A flavor composition consisting of:

(i) between about 0.1% w/w and about 20% w/w dimethylhydroxy furanone;

(ii) between about 5% w/w and about 80% w/w δ-dodecalactone;

(iii) between about 0.005% w/w and about 1% w/w phenylacetaldehyde;

(iv) between about 0.1% w/w and about 5% w/w maltol;

(v) between about 0.001% w/w and about 0.1% w/w methanethiol;

(vi) between about 0.5% w/w and about 15% w/w δ-decalactone;

(vii) between about 0.1% w/w and about 3% w/w δ-octalactone;

(viii) between about 0.05% w/w and about 5% w/w γ-nonalactone; and (ix) between about 0.01% w/w and about 1% w/w γ-undecalactone.

21. The flavor composition of claim 20, wherein the flavor composition consists of:

(i) about 18.5% w/w dimethylhydroxy furanone;

(ii) about 69% w/w δ-dodecalactone;

(iii) about 0.6% w/w phenylacetaldehyde;

(iv) about 0.3% w/w maltol;

(v) about 0.08% w/w methanethiol;

(vi) about 7.1% w/w δ-decalactone;

(vii) about 0.7% w/w δ-octalactone;

(viii) about 3.9% w/w γ-nonalactone; and (ix) about 0.2% w/w γ-undecalactone.

22. The flavor composition of claim 20, wherein the flavor composition consists of:

(i) about 5.2% w/w dimethylhydroxy furanone;

(ii) about 73% w/w δ-dodecalactone;

(iii) about 0.3% w/w phenylacetaldehyde;

(iv) about 4.5% w/w maltol;

(v) about 0.03% w/w methanethiol;

(vi) about 12.3% w/w δ-decalactone;

(vii) about 2.7% w/w δ-octalactone;

(viii) about 1.5% w/w γ-nonalactone; and (ix) about 0.6% w/w γ-undecalactone.

* * * * *